United States Patent
Chen

(10) Patent No.: US 10,854,095 B2
(45) Date of Patent: Dec. 1, 2020

(54) FLIGHT CONTROL METHOD AND APPARATUS, FLIGHT CLEARANCE METHOD, FLIGHT SAFETY MAINTENANCE METHOD AND APPARATUS, SERVER, AND AERIAL VEHICLE

(71) Applicant: HUAWEI TECHNOLOGIES CO., LTD., Guangdong (CN)

(72) Inventor: Shanxi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 430 days.

(21) Appl. No.: 15/892,682

(22) Filed: Feb. 9, 2018

(65) Prior Publication Data

US 2018/0165971 A1 Jun. 14, 2018

Related U.S. Application Data

(63) Continuation of application No. PCT/CN2016/079877, filed on Apr. 21, 2016.

(30) Foreign Application Priority Data

Aug. 10, 2015 (CN) .......................... 2015 1 0485937

(51) Int. Cl.
*G08G 5/00* (2006.01)
*B64C 39/02* (2006.01)
*G05D 1/00* (2006.01)

(52) U.S. Cl.
CPC .......... *G08G 5/006* (2013.01); *B64C 39/024* (2013.01); *G05D 1/0022* (2013.01);
(Continued)

(58) Field of Classification Search
None
See application file for complete search history.

(56) References Cited

U.S. PATENT DOCUMENTS 7,312,744 B1 12/2007 Ramstack
7,714,744 B1 * 5/2010 Wichgers ............... G08G 5/045
340/965
(Continued)

FOREIGN PATENT DOCUMENTS

CN 101833870 A 9/2010
CN 102637023 A 8/2012
(Continued)

OTHER PUBLICATIONS

Extended European Search Report issued in European Application No. 16834438.0 dated Mar. 4, 2019, 9 pages.
(Continued)

*Primary Examiner* — Shelley Chen
(74) *Attorney, Agent, or Firm* — Fish & Richardson P.C.

(57) ABSTRACT

The present disclosure includes a flight control method and apparatus. An example includes determining, when an unmanned aerial vehicle is flying, a specific flight zone to be entered by the unmanned aerial vehicle, where a flight clearance is required for the unmanned aerial vehicle to enter the specific flight zone. Application information and information about the specific flight zone is sent to a server, where the application information is used to apply for the flight clearance to enter the specific flight zone, and the information about the specific flight zone is used to indicate the specific flight zone. A flight instruction is sent when a flight clearance sent by the server is received, so that the unmanned aerial vehicle enters the specific flight zone according to the flight instruction.

15 Claims, 7 Drawing Sheets

(52) U.S. Cl.
CPC ......... *G05D 1/0044* (2013.01); *G05D 1/0055* (2013.01); *G08G 5/003* (2013.01); *G08G 5/0013* (2013.01); *G08G 5/0039* (2013.01); *G08G 5/0043* (2013.01); *G08G 5/0069* (2013.01); *B64C 2201/146* (2013.01)

(56) References Cited

U.S. PATENT DOCUMENTS

| | | | |
|---|---|---|---|
| 9,087,451 B1* | 7/2015 | Jarrell | G08G 5/0091 |
| 2002/0022909 A1 | 2/2002 | Karem | |
| 2006/0267833 A1 | 11/2006 | Langford | |
| 2008/0051947 A1* | 2/2008 | Kemp | B64D 45/0015 |
| | | | 701/3 |
| 2008/0183344 A1* | 7/2008 | Doyen | G08B 3/10 |
| | | | 701/9 |
| 2010/0004798 A1 | 1/2010 | Bodin et al. | |
| 2011/0202206 A1* | 8/2011 | Karthikeyan | G01C 23/00 |
| | | | 701/3 |
| 2011/0288695 A1 | 11/2011 | Gariepy et al. | |
| 2012/0022778 A1 | 1/2012 | Mishra | |
| 2013/0085629 A1 | 4/2013 | Washington et al. | |
| 2014/0163852 A1 | 6/2014 | Borri et al. | |
| 2015/0254988 A1* | 9/2015 | Wang | B64D 47/08 |
| | | | 701/3 |
| 2017/0030719 A1* | 2/2017 | Ishida | G09B 29/10 |
| 2017/0206663 A1* | 7/2017 | Ishida | G06T 7/11 |

FOREIGN PATENT DOCUMENTS

| | | |
|---|---|---|
| CN | 103748527 A | 4/2014 |
| CN | 104750111 A | 7/2015 |
| CN | 104809918 A | 7/2015 |
| CN | 105206114 A | 12/2015 |
| CN | 105206116 A | 12/2015 |
| EP | 1307797 A2 | 5/2003 |
| EP | 2410295 A3 | 2/2013 |

OTHER PUBLICATIONS

Lawrence R, Abstract of Commercial UAV Operatians in Civil Airspace Proceedings of SPIE, Proceedings vol. 4127, Nov. 29, 2000. total 2 pages.
International Search Report and Written Opinion in International Application No. PCT/CN2016/079877, dated Jun. 28, 2016, 29 pages.
Chinese Office Action in Chinese Applicaton No. 201510485937.7, dated Feb. 3, 2017, 20 pages.

* cited by examiner

FLIGHT CONTROL METHOD AND APPARATUS, FLIGHT CLEARANCE METHOD, FLIGHT SAFETY MAINTENANCE METHOD AND APPARATUS, SERVER, AND AERIAL VEHICLE

CROSS-REFERENCE TO RELATED APPLICATIONS

This application is a continuation of International Application No. PCT/CN2016/079877, filed on Apr. 21, 2016, which claims priority to Chinese Patent Application No. 201510485937.7, filed on Aug. 10, 2015. The disclosures of the aforementioned applications are hereby incorporated by reference in their entireties.

TECHNICAL FIELD

The present invention relates to the field of aerial vehicle technologies, and in particular, to a flight control method and apparatus, a flight clearance method, a flight safety maintenance method and apparatus, a server, and an aerial vehicle.

BACKGROUND

In recent years, an unmanned aerial vehicle (UAV) becomes a consumption hotspot and a commercial hotspot. However, recently, emergencies that a UAV appears in a highly safety-sensitive area happen frequently. Consequently, the UAV also becomes a hotspot in public safety and social management.

A solution is to load a clearance file into a flight control apparatus that controls a flight of an unmanned aerial vehicle, so that the unmanned aerial vehicle can fly only within a range specified in the clearance file. Currently, a method for loading a clearance file is manually registering each unmanned aerial vehicle with a relevant administrative department, and then installing the clearance file in a flight control apparatus of the unmanned aerial vehicle.

However, the existing method for loading a clearance file limits large-scale application of unmanned aerial vehicles.

SUMMARY

Embodiments of the present invention provide a flight control method and apparatus, a flight clearance method, a flight safety maintenance method and apparatus, a server, and an aerial vehicle, to improve flexibility of a flight route of an unmanned aerial vehicle.

A first aspect of the embodiments of the present invention provides a flight control method, including:
determining, when an unmanned aerial vehicle is flying, a specific flight zone to be entered by the unmanned aerial vehicle, where a flight clearance is required for the unmanned aerial vehicle to enter the specific flight zone;
sending application information and information about the specific flight zone to a server, where the application information is used to apply for the flight clearance to enter the specific flight zone, and the information about the specific flight zone is used to indicate the specific flight zone; and
sending a flight instruction when a flight clearance sent by the server is received, so that the unmanned aerial vehicle enters the specific flight zone according to the flight instruction.

With reference to the first aspect, in a first possible implementation manner of the first aspect, the determining a specific flight zone to be entered by the unmanned aerial vehicle includes:
obtaining a predetermined flight route of the unmanned aerial vehicle and a current position of the unmanned aerial vehicle; and
determining, from the predetermined flight route according to the current position, at least one specific flight zone that is to be entered.

With reference to the first aspect, in a second possible implementation manner of the first aspect, the determining a specific flight zone to be entered by the unmanned aerial vehicle includes:
obtaining a current position of the unmanned aerial vehicle;
sending the current position to the server;
receiving response data sent by the server, where the response data includes information about a specific flight zone set, and a distance between each specific flight zone in the specific flight zone set and the current position is less than a preset value; and
determining, from the specific flight zone set, the specific flight zone that is to be entered.

With reference to the second possible implementation manner of the first aspect, in a third possible implementation manner of the first aspect, the flight control method is executed by an aerial remote controller, the response data specifically includes map information of a preset area, and the current position of the unmanned aerial vehicle and each specific flight zone in the specific flight zone set are located in the preset area;
after the receiving response data sent by the server, the method further includes:
displaying a map of the preset area, where the current position of the unmanned aerial vehicle and a boundary of each specific flight zone in the specific flight zone set are highlighted in the map; and
the determining, from the specific flight zone set, the specific flight zone that is to be entered includes:
receiving a designation of at least one specific flight zone in the specific flight zone set; and
determining the designated at least one specific flight zone as the specific flight zone that is to be entered.

With reference to the first aspect, in a fourth possible implementation manner of the first aspect, the determining a specific flight zone to be entered by the unmanned aerial vehicle includes:
determining, when a boundary identifier that is of a specific flight zone and that is detected by a detector is received, a specific flight zone indicated by the boundary identifier as the specific flight zone that is to be entered, where the detector is located in the unmanned aerial vehicle, and is configured to detect a boundary identifier of a specific flight zone when the unmanned aerial vehicle is flying.

With reference to any one of the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, the application information includes at least one of a type identification code of the unmanned aerial vehicle, a machine serial number of the unmanned aerial vehicle, a user identity corresponding to the unmanned aerial vehicle, the current position of the unmanned aerial vehicle, or a scheduled flight time of the unmanned aerial vehicle in the specific flight zone.

A second aspect of the embodiments of the present invention provides a flight clearance method, including:

receiving, by a server, application information and information about a specific flight zone, where the application information is used to apply for a flight clearance for an unmanned aerial vehicle to enter the specific flight zone, and the server stores a preset condition corresponding to the specific flight zone;

determining, by the server according to the application information, whether the unmanned aerial vehicle meets the preset condition; and sending, by the server, the flight clearance when the unmanned aerial vehicle meets the preset condition.

With reference to the second aspect, in a first possible implementation manner of the second aspect, the server includes a gateway server and at least two subservers, and different subservers are configured to process application information for different types of specific flight zones;

the receiving, by a server, application information and information about a specific flight zone includes:

receiving, by the gateway server, the application information and the information about the specific flight zone; and the determining, by the server according to the application information, whether the unmanned aerial vehicle meets the preset condition includes:

determining, by the gateway server, a type of the specific flight zone; and sending, by the gateway server, the application information and the information about the specific flight zone to a subserver corresponding to the type of the specific flight zone, so that the subserver determines, according to the application information, whether the unmanned aerial vehicle meets the preset condition.

With reference to the second aspect, in a second possible implementation manner of the second aspect, the application information includes at least one of a type identification code of the unmanned aerial vehicle, a machine serial number of the unmanned aerial vehicle, a user identity corresponding to the unmanned aerial vehicle, a current position of the unmanned aerial vehicle, or a flight time of the unmanned aerial vehicle in the specific flight zone; and the information about the specific flight zone is used to indicate the specific flight zone to be entered by the unmanned aerial vehicle.

With reference to the second aspect, in a third possible implementation manner of the second aspect, the preset condition includes a first subcondition and a second subcondition, and the method further includes:

obtaining, by the server, accessory information of the unmanned aerial vehicle, where the accessory information of the unmanned aerial vehicle includes at least one of an examination record of the unmanned aerial vehicle, an aerial vehicle safety accident rate of the type of the unmanned aerial vehicle, a safety record of a user corresponding to the unmanned aerial vehicle, commercial credit of a user corresponding to the unmanned aerial vehicle, or an account balance corresponding to the unmanned aerial vehicle; and the determining, by the server according to the application information, whether the unmanned aerial vehicle meets the preset condition includes:

determining, according to the application information, whether the unmanned aerial vehicle meets the first subcondition; and determining, according to the accessory information, whether the unmanned aerial vehicle meets the second subcondition, where that the unmanned aerial vehicle meets the preset condition includes:

the unmanned aerial vehicle meets both the first subcondition and the second subcondition.

With reference to the second aspect, in a fourth possible implementation manner of the second aspect, the server stores a correspondence between a specific flight zone and a network access IP address; and the determining, according to the application information, whether the unmanned aerial vehicle meets the preset condition includes:

obtaining, by the server, a network access IP address of the unmanned aerial vehicle; and determining, by the server according to the correspondence, whether the network access IP address of the unmanned aerial vehicle is corresponding to the specific flight zone, where that the unmanned aerial vehicle meets the preset condition includes:

the network access IP address of the unmanned aerial vehicle is corresponding to the specific flight zone.

With reference to the fourth possible implementation manner of the second aspect, in a fifth possible implementation manner of the second aspect, the method further includes:

triggering a preset safety control action when it is determined that the network access IP address of the unmanned aerial vehicle is not corresponding to the specific flight zone.

With reference to the second aspect, in a sixth possible implementation manner of the second aspect, before the receiving, by a server, application information and information about a specific flight zone, the method further includes:

receiving, by the server, a current position of the unmanned aerial vehicle;

determining, by the server, a specific flight zone set according to the current position, where a distance between each specific flight zone in the specific flight zone set and the current position is less than a preset value; and sending, by the server, response data, where the response data includes information about the specific flight zone set.

With reference to the second aspect, in a seventh possible implementation manner of the second aspect, the method further includes:

when the unmanned aerial vehicle meets the preset condition, storing, by the server, the application information of the unmanned aerial vehicle and the information about the specific flight zone;

receiving, by the server, query information sent by a maintenance apparatus, where the query information includes information about a specific flight zone and an identifier of an unmanned aerial vehicle that appears in the specific flight zone;

obtaining, by the server, a query result according to the query information, where the query result is used to indicate whether the unmanned aerial vehicle has a flight clearance for the specific flight zone; and sending the query result to the maintenance apparatus.

A third aspect of the embodiments of the present invention provides a flight safety maintenance method, including:

performing, by a maintenance apparatus, real-time detection on at least some areas in a specific flight zone;

obtaining an identifier of an unmanned aerial vehicle when the maintenance apparatus detects that the unmanned aerial vehicle appears in the at least some areas;

sending, by the maintenance apparatus, query information to the server, where the query information includes information about the specific flight zone and the identifier of the unmanned aerial vehicle;

receiving, by the maintenance apparatus, a query result sent by the server, where the query result is used to indicate whether the unmanned aerial vehicle has a flight clearance for the specific flight zone; and triggering, by the maintenance apparatus, a preset action when the query result indicates that the unmanned aerial vehicle does not have the flight clearance for the specific flight zone.

A fourth aspect of the embodiments of the present invention provides a flight control apparatus, including:

a determining module, configured to determine, when an unmanned aerial vehicle is flying, a specific flight zone to be entered by the unmanned aerial vehicle, where a flight clearance is required for the unmanned aerial vehicle to enter the specific flight zone;

an application module, configured to send application information and information about the specific flight zone to a server, where the application information is used to apply for the flight clearance to enter the specific flight zone, and the information about the specific flight zone is used to indicate the specific flight zone; and a sending module, configured to send a flight instruction when a flight clearance sent by the server is received, so that the unmanned aerial vehicle enters the specific flight zone according to the flight instruction.

With reference to the fourth aspect, in a first possible implementation manner of the fourth aspect, the determining module is specifically configured to: obtain a predetermined flight route of the unmanned aerial vehicle and a current position of the unmanned aerial vehicle; and determine, from the predetermined flight route according to the current position, at least one specific flight zone that is to be entered.

With reference to the fourth aspect, in a second possible implementation manner of the fourth aspect, the determining module is specifically configured to: obtain a current position of the unmanned aerial vehicle; send the current position to the server; receive response data sent by the server, where the response data includes information about a specific flight zone set, and a distance between each specific flight zone in the specific flight zone set and the current position is less than a preset value; and determine, from the specific flight zone set, the specific flight zone that is to be entered.

With reference to the second possible implementation manner of the fourth aspect, in a third possible implementation manner of the fourth aspect, the flight control apparatus is an aerial remote controller, the response data specifically includes map information of a preset area, and the current position of the unmanned aerial vehicle and each specific flight zone in the specific flight zone set are located in the preset area; and the flight control apparatus further includes:

a display module, configured to display a map of the preset area after the response data sent by the server is received, where the current position of the unmanned aerial vehicle and a boundary of each specific flight zone in the specific flight zone set are highlighted in the map; and the determining module is specifically configured to: receive a designation of at least one specific flight zone in the specific flight zone set, and determine the designated at least one specific flight zone as the specific flight zone that is to be entered.

With reference to the fourth aspect, in a fourth possible implementation manner of the fourth aspect, the determining module is specifically configured to determine, when a boundary identifier that is of a specific flight zone and that is detected by a detector is received, a specific flight zone indicated by the boundary identifier as the specific flight zone that is to be entered, where the detector is located in the unmanned aerial vehicle, and is configured to detect a boundary identifier of a specific flight zone when the unmanned aerial vehicle is flying.

With reference to the any one of fourth aspect, the first possible implementation manner of the fourth aspect, the second possible implementation manner of the fourth aspect, the third possible implementation manner of the fourth aspect, or the fourth possible implementation manner of the fourth aspect, in a fifth possible implementation manner of the fourth aspect, the application information includes at least one of a type identification code of the unmanned aerial vehicle, a machine serial number of the unmanned aerial vehicle, a user identity corresponding to the unmanned aerial vehicle, the current position of the unmanned aerial vehicle, or a scheduled flight time of the unmanned aerial vehicle in the specific flight zone.

A fifth aspect of the embodiments of the present invention provides a server, including:

a first receiving module, configured to receive application information and information about a specific flight zone, where the application information is used to apply for a flight clearance for an unmanned aerial vehicle to enter the specific flight zone, and the server stores a preset condition corresponding to the specific flight zone;

a first determining module, configured to determine, according to the application information, whether the unmanned aerial vehicle meets the preset condition; and a first sending module, configured to send the flight clearance when the first determining module determines that the unmanned aerial vehicle meets the preset condition.

With reference to the fifth aspect, in a first possible implementation manner of the fifth aspect, the server includes a gateway server and at least two subservers, and different subservers are configured to process application information for different types of specific flight zones; the first receiving module and the first sending module are located in the gateway server; and the subserver includes the first determining module; and the gateway server further includes:

a classification module, configured to: determine a type of the specific flight zone, and send the application information and the information about the specific flight zone to a subserver corresponding to the type of the specific flight zone, so that the first determining module in the subserver determines, according to the application information, whether the unmanned aerial vehicle meets the preset condition.

With reference to the fifth aspect, in a second possible implementation manner of the fifth aspect, the application information includes at least one of a type identification code of the unmanned aerial vehicle, a machine serial number of the unmanned aerial vehicle, a user identity corresponding to the unmanned aerial vehicle, a current position of the unmanned aerial vehicle, or a flight time of the unmanned aerial vehicle in the specific flight zone; and the information about the specific flight zone is used to indicate the specific flight zone to be entered by the unmanned aerial vehicle.

With reference to the fifth aspect, in a third possible implementation manner of the fifth aspect, the preset condition includes a first subcondition and a second subcondition, and the server further includes:

a first obtaining module, configured to obtain accessory information of the unmanned aerial vehicle, where the accessory information of the unmanned aerial vehicle includes at least one of an examination record of the unmanned aerial vehicle, an aerial vehicle safety accident rate of the type of the unmanned aerial vehicle, a safety record of a user corresponding to the unmanned aerial vehicle, commercial credit of a user corresponding to the unmanned aerial vehicle, or an account balance corresponding to the unmanned aerial vehicle; and the first determining module is specifically configured to: determine, according to the application information, whether the unmanned aerial vehicle meets the first subcondition; determine, according to the accessory information, whether the unmanned aerial vehicle meets the second subcondition; and when the unmanned aerial vehicle meets both the first subcondition and the second subcondition, determine that the unmanned aerial vehicle meets the preset condition.

With reference to the fifth aspect, in a fourth possible implementation manner of the fifth aspect, the server stores a correspondence between a specific flight zone and a network access IP address; and the first determining module is specifically configured to: obtain a network access IP address of the unmanned aerial vehicle; determine, according to the correspondence, whether the network access IP address of the unmanned aerial vehicle is corresponding to the specific flight zone; and when the network access IP address of the unmanned aerial vehicle is corresponding to the specific flight zone, determine that the unmanned aerial vehicle meets the preset condition.

With reference to the fourth possible implementation manner of the fifth aspect, in a fifth possible implementation manner of the fifth aspect, the server further includes:

a trigger module, configured to trigger a preset safety control action when it is determined that the network access IP address of the unmanned aerial vehicle is not corresponding to the specific flight zone.

With reference to the fifth aspect, in a sixth possible implementation manner of the fifth aspect, the server further includes:

a second receiving module, configured to receive a current position of the unmanned aerial vehicle;

a second determining module, configured to determine a specific flight zone set according to the current position, where a distance between each specific flight zone in the specific flight zone set and the current position is less than a preset value; and a second sending module, configured to send response data, where the response data includes information about the specific flight zone set.

With reference to the fifth aspect, in a seventh possible implementation manner of the fifth aspect, the server further includes:

a storage module, configured to: when the unmanned aerial vehicle meets the preset condition, store the application information of the unmanned aerial vehicle and the information about the specific flight zone;

a third receiving module, configured to receive query information sent by a maintenance apparatus, where the query information includes information about a specific flight zone and an identifier of an unmanned aerial vehicle that appears in the specific flight zone;

a second obtaining module, configured to obtain a query result according to the query information, where the query result is used to indicate whether the unmanned aerial vehicle has a flight clearance for the specific flight zone; and a third sending module, configured to send the query result to the maintenance apparatus.

A sixth aspect of the embodiments of the present invention provides a flight safety maintenance apparatus, including:

a detection module, configured to perform real-time detection on at least some areas in a specific flight zone;

an obtaining module, configured to obtain an identifier of an unmanned aerial vehicle when the maintenance apparatus detects that the unmanned aerial vehicle appears in the at least some areas;

a sending module, configured to send query information to the server, where the query information includes information about the specific flight zone and the identifier of the unmanned aerial vehicle;

a receiving module, configured to receive a query result sent by the server, where the query result is used to indicate whether the unmanned aerial vehicle has a flight clearance for the specific flight zone; and a trigger module, configured to trigger a preset action when the query result indicates that the unmanned aerial vehicle does not have the flight clearance for the specific flight zone.

A seventh aspect of the embodiments of the present invention provides an unmanned aerial vehicle, including the flight control apparatus according to any one of the fourth aspect, or the first to the fifth possible implementation manners of the fourth aspect of the embodiments of the present invention.

An eighth aspect of the embodiments of the present invention provides an aerial vehicle controller, including:

a processor and a memory coupled to the processor, where the processor reads a computer program stored in the memory, to execute the following operations:

determining, when an unmanned aerial vehicle is flying, a specific flight zone to be entered by the unmanned aerial vehicle, where a flight clearance is required for the unmanned aerial vehicle to enter the specific flight zone;

sending application information and information about the specific flight zone to a server, where the application information is used to apply for the flight clearance to enter the specific flight zone, and the information about the specific flight zone is used to indicate the specific flight zone; and sending a flight instruction when a flight clearance sent by the server is received, so that the unmanned aerial vehicle enters the specific flight zone according to the flight instruction.

With reference to the eighth aspect, in a first possible implementation manner of the eighth aspect, the determining a specific flight zone to be entered by the unmanned aerial vehicle includes:

obtaining a predetermined flight route of the unmanned aerial vehicle and a current position of the unmanned aerial vehicle; and determining, from the predetermined flight route according to the current position, at least one specific flight zone that is to be entered.

With reference to the eighth aspect, in a second possible implementation manner of the eighth aspect, the determining a specific flight zone to be entered by the unmanned aerial vehicle includes:

obtaining a current position of the unmanned aerial vehicle;

sending the current position to the server;

receiving response data sent by the server, where the response data includes information about a specific flight zone set, and a distance between each specific flight zone in the specific flight zone set and the current position is less than a preset value; and determining, from the specific flight zone set, the specific flight zone that is to be entered.

With reference to the second possible implementation manner of the eighth aspect, in a third possible implementation manner of the eighth aspect, the aerial vehicle controller is an aerial remote controller, the response data specifically includes map information of a preset area, and the current position of the unmanned aerial vehicle and each specific flight zone in the specific flight zone set are located in the preset area;

after receiving the response data sent by the server, the processor is further configured to execute the following operation:

displaying a map of the preset area, where the current position of the unmanned aerial vehicle and a boundary of each specific flight zone in the specific flight zone set are highlighted in the map; and the determining, from the specific flight zone set, the specific flight zone that is to be entered includes:

receiving a designation of at least one specific flight zone in the specific flight zone set; and determining the designated at least one specific flight zone as the specific flight zone that is to be entered.

With reference to the eighth aspect, in a fourth possible implementation manner of the eighth aspect, the determining a specific flight zone to be entered by the unmanned aerial vehicle includes:

determining, when a boundary identifier that is of a specific flight zone and that is detected by a detector is received, a specific flight zone indicated by the boundary identifier as the specific flight zone that is to be entered, where the detector is located in the unmanned aerial vehicle, and is configured to detect a boundary identifier of a specific flight zone when the unmanned aerial vehicle is flying.

With reference to the any one of eighth aspect, the first possible implementation manner of the eighth aspect, the second possible implementation manner of the eighth aspect, the third possible implementation manner of the eighth aspect, or the fourth possible implementation manner of the eighth aspect, in a fifth possible implementation manner of the eighth aspect, the application information includes at least one of a type identification code of the unmanned aerial vehicle, a machine serial number of the unmanned aerial vehicle, a user identity corresponding to the unmanned aerial vehicle, the current position of the unmanned aerial vehicle, or a scheduled flight time of the unmanned aerial vehicle in the specific flight zone.

A ninth aspect of the embodiments of the present invention provides a server, including:

a processor and a memory coupled to the processor, where the processor reads a computer program stored in the memory, to execute the following operations:

receiving application information and information about a specific flight zone, where the application information is used to apply for a flight clearance for an unmanned aerial vehicle to enter the specific flight zone, and the memory stores a preset condition corresponding to the specific flight zone;

determining, according to the application information, whether the unmanned aerial vehicle meets the preset condition; and sending the flight clearance when the unmanned aerial vehicle meets the preset condition.

With reference to the ninth aspect, in a first possible implementation manner of the ninth aspect, the server includes a gateway server and at least two subservers, and different subservers are configured to process application information for different types of specific flight zones;

the gateway server includes a first processor, and a first memory coupled to the first processor, where the first processor reads a computer program stored in the first memory, to execute the following operations:

receiving the application information and the information about the specific flight zone; determining a type of the specific flight zone; and sending the application information and the information about the specific flight zone to a subserver corresponding to the type of the specific flight zone;

the subserver includes a second processor, and a second memory coupled to the second processor, where the second processor reads a computer program stored in the second memory, to execute the following operations:

receiving the application information and the information about the specific flight zone; and determining, according to the application information, whether the unmanned aerial vehicle meets the preset condition; and the first processor is further configured to execute the following operation:

sending the flight clearance when the unmanned aerial vehicle meets the preset condition.

With reference to the ninth aspect, in a second possible implementation manner of the ninth aspect, the application information includes at least one of a type identification code of the unmanned aerial vehicle, a machine serial number of the unmanned aerial vehicle, a user identity corresponding to the unmanned aerial vehicle, a current position of the unmanned aerial vehicle, or a flight time of the unmanned aerial vehicle in the specific flight zone; and the information about the specific flight zone is used to indicate the specific flight zone to be entered by the unmanned aerial vehicle.

With reference to the ninth aspect, in a third possible implementation manner of the ninth aspect, the preset condition includes a first subcondition and a second subcondition, and the processor is further configured to execute the following operation:

obtaining accessory information of the unmanned aerial vehicle, where the accessory information of the unmanned aerial vehicle includes at least one of an examination record of the unmanned aerial vehicle, an aerial vehicle safety accident rate of the type of the unmanned aerial vehicle, a safety record of a user corresponding to the unmanned aerial vehicle, commercial credit of a user corresponding to the unmanned aerial vehicle, or an account balance corresponding to the unmanned aerial vehicle;

the determining, according to the application information, whether the unmanned aerial vehicle meets the preset condition includes:

determining, according to the application information, whether the unmanned aerial vehicle meets the first subcondition; and determining, according to the accessory information, whether the unmanned aerial vehicle meets the second subcondition, where that the unmanned aerial vehicle meets the preset condition includes:

the unmanned aerial vehicle meets both the first subcondition and the second subcondition.

With reference to the ninth aspect, in a fourth possible implementation manner of the ninth aspect, the memory stores a correspondence between a specific flight zone and a network access IP address; and the processor is further configured to execute the following operations:

obtaining a network access IP address of the unmanned aerial vehicle; determining, according to the correspondence, whether the network access IP address of the unmanned aerial vehicle is corresponding to the specific flight zone; and when the network access IP address of the unmanned aerial vehicle is corresponding to the specific flight zone, determining that the unmanned aerial vehicle meets the preset condition.

With reference to the fourth possible implementation manner of the ninth aspect, in a fifth possible implementation manner of the ninth aspect, the processor is further configured to execute the following operation:

triggering a preset safety control action when it is determined that the network access IP address of the unmanned aerial vehicle is not corresponding to the specific flight zone.

With reference to the ninth aspect, in a sixth possible implementation manner of the ninth aspect, before receiving the application information and the information about the specific flight zone, the processor is further configured to execute the following operations:

receiving a current position of the unmanned aerial vehicle;

determining a specific flight zone set according to the current position, where a distance between each specific flight zone in the specific flight zone set and the current position is less than a preset value; and sending response data, where the response data includes information about the specific flight zone set.

With reference to the ninth aspect, in a seventh possible implementation manner of the ninth aspect, the processor is further configured to execute the following operations:

when the unmanned aerial vehicle meets the preset condition, storing the application information of the unmanned aerial vehicle and the information about the specific flight zone;

receiving query information sent by a maintenance apparatus, where the query information includes information about a specific flight zone and an identifier of an unmanned aerial vehicle that appears in the specific flight zone;

obtaining a query result according to the query information, where the query result is used to indicate whether the unmanned aerial vehicle has a flight clearance for the specific flight zone; and sending the query result to the maintenance apparatus.

A tenth aspect of the embodiments of the present invention provides a flight safety maintenance device, including:

a processor and a memory coupled to the processor, where the processor reads a computer program stored in the memory, to execute the following operations:

performing real-time detection on at least some areas in a specific flight zone;

obtaining an identifier of an unmanned aerial vehicle when it is detected that the unmanned aerial vehicle appears in the at least some areas;

sending query information to the server, where the query information includes information about the specific flight zone and the identifier of the unmanned aerial vehicle;

receiving a query result sent by the server, where the query result is used to indicate whether the unmanned aerial vehicle has a flight clearance for the specific flight zone; and triggering a preset action when the query result indicates that the unmanned aerial vehicle does not have the flight clearance for the specific flight zone.

An eleventh aspect of the embodiments of the present invention provides an unmanned aerial vehicle, including the aerial vehicle controller according to any one of the eighth aspect, or the first to the fifth possible implementation manners of the eighth aspect of the embodiments of the present invention.

It can be learned from the foregoing technical solutions that the embodiments of the present invention have the following advantages:

In the embodiments of the present invention, in a flight process of an unmanned aerial vehicle, a specific flight zone that is to be entered is determined, a flight clearance for the specific flight zone is applied for from a server, and after a flight clearance from the server is received, the unmanned aerial vehicle is controlled to enter the specific flight zone. In this way, the unmanned aerial vehicle can change a flight route as required in the flight process, instead of being limited to flying strictly according to an approved flight route as described in the background. This can significantly improve flexibility of a flight route of the unmanned aerial vehicle.

DESCRIPTION OF EMBODIMENTS

Figure 1:
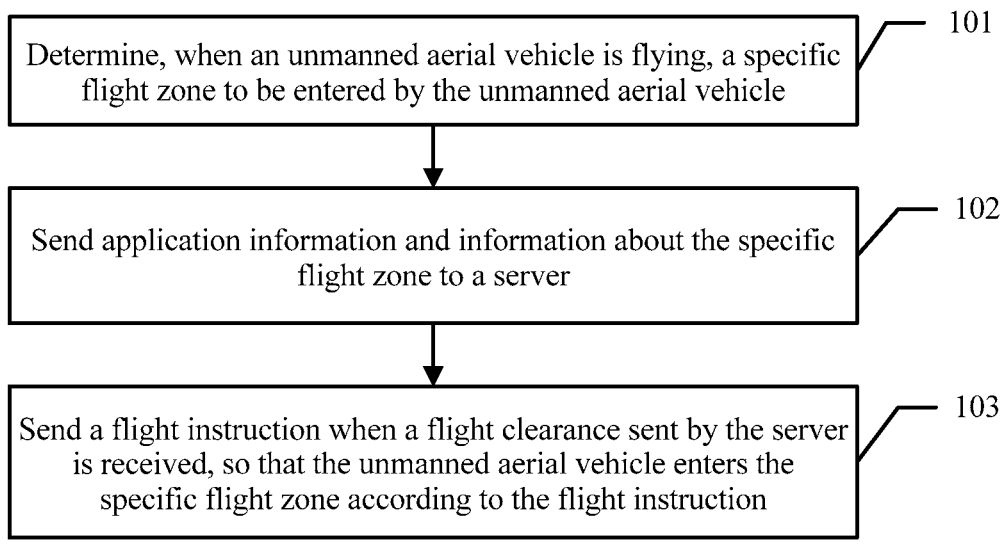
FIG. 1 is a schematic flowchart of an embodiment of a flight control method according to the present invention.

Embodiments of the present invention provide a flight control method and apparatus, a flight clearance method, a flight safety maintenance method and apparatus, a server, and an aerial vehicle, to improve flexibility of a flight route of an unmanned aerial vehicle.

To make persons skilled in the art understand the technical solutions in the present invention better, the following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present invention without creative efforts shall fall within the protection scope of the present invention.

The terms "include", "contain" and any other variants in the specification, claims, and the accompanying drawings of the present invention mean to cover the non-exclusive inclusion, for example, a process, method, system, product, or device that includes a series of steps or units is not necessarily limited to those expressly listed steps or units, but may include other steps or units not expressly listed or inherent to such a process, method, system, product, or device.

A flight management system provided in the embodiments of the present invention includes an unmanned aerial vehicle (English: Unmanned Aerial Vehicle, UAV for short) and a server. The unmanned aerial vehicle includes an aerial vehicle controller (English: Aerial Vehicle Controller, AVC for short) and a physical apparatus (referred to as an aerial physical apparatus below for ease of description) that is connected to the aerial vehicle controller and that is configured to execute a flight action under control of the aerial vehicle controller. Alternatively, the flight management system may further include an aerial remote controller (English: Aerial Remote Controller, ARC for short) or another controller, configured to send a flight instruction to the aerial vehicle controller, so that the aerial vehicle controller controls, according to the flight instruction, the aerial physical apparatus to fly.

The flight clearance method provided in the embodiments of the present invention is executed by the server. The flight control method may be executed by an aerial vehicle controller, an aerial remote controller, or another controller that can send a flight instruction so that the aerial vehicle controller can control, according to the flight instruction, an aerial physical apparatus to fly, and this is not limited herein. For ease of description, the aerial vehicle controller and the aerial remote controller or the another controller that can send a flight instruction so that the aerial vehicle controller can control, according to the flight instruction, an aerial physical apparatus to fly are collectively referred to as a flight control apparatus below. That is, the flight control method is executed by the flight control apparatus.

In an actual application, there are some areas. Before entering the areas, an unmanned aerial vehicle needs to obtain flight clearances to enter the areas, so as to fly in the areas. If the unmanned aerial vehicle does not obtain the flight clearances to enter the areas, an entry to the areas by the unmanned aerial vehicle is considered an illegal entry. For ease of description, an area that can be entered by an unmanned aerial vehicle only by using a flight clearance is referred to as a specific flight zone below.

In the embodiments of the present invention, the flight control apparatus can communicate with the server. In a flight process of an unmanned aerial vehicle, the flight control apparatus determines a specific flight zone to be entered by the unmanned aerial vehicle, and sends application information for the specific flight zone to the server. The application information is used to apply for a flight clearance to enter the specific flight zone. The server is configured to review the application information sent by the flight control apparatus, so as to determine whether to send a flight clearance to the flight control apparatus. The flight control apparatus sends a flight instruction only after receiving the flight clearance sent by the server, so that the unmanned aerial vehicle enters the specific flight zone according to the flight instruction.

The flight control method of the present invention is described in detail below.

Referring to FIG. 1, FIG. 1 is a schematic flowchart of an embodiment of a flight control method according to the present invention. As shown in FIG. 1, the flight control method in this embodiment includes the following steps.

101. Determine, when an unmanned aerial vehicle is flying, a specific flight zone to be entered by the unmanned aerial vehicle.

In this embodiment, the specific flight zone is a flight zone that can be entered by an unmanned aerial vehicle only by using a flight clearance, for example, a zone related to military affairs, safety, or commercial interests.

In this embodiment, the unmanned aerial vehicle does not take off only after an aerial vehicle controller obtains through application in advance for flight clearances for all specific flight zones to be entered by the unmanned flight vehicle. Instead, a flight control apparatus determines, in real time in a flight process of the unmanned aerial vehicle, at least one specific flight zone that is to be entered, and then applies to a server for a flight clearance for the at least one specific flight zone.

There are multiple methods for determining the specific flight zone to be entered by the unmanned aerial vehicle.

For example, the determining a specific flight zone to be entered by the unmanned aerial vehicle includes: obtaining a predetermined flight route of the unmanned aerial vehicle and a current position of the unmanned aerial vehicle; and determining, from the predetermined flight route according to the current position, at least one specific flight zone that is to be entered.

The predetermined flight route of the unmanned aerial vehicle may be obtained before or after the unmanned aerial vehicle takes off, and this is not limited herein. A global positioning system (English: Global Positioning System, GPS for short) is provided in the unmanned aerial vehicle, and is configured to position the unmanned aerial vehicle. After the unmanned aerial vehicle takes off, the flight control apparatus receives information about the current position of the unmanned aerial vehicle that is sent by the GPS.

In an actual application, the predetermined flight route of the unmanned aerial vehicle may be obtained before the unmanned aerial vehicle takes off, and the current position of the unmanned aerial vehicle may be obtained in the flight process of the unmanned aerial vehicle, so as to determine a specific flight zone that is located after the current position of the unmanned aerial vehicle and through which the predetermined flight route passes. Alternatively, the predetermined flight route of the unmanned aerial vehicle and the current position of the unmanned aerial vehicle may be obtained after the unmanned aerial vehicle takes off, so as to determine a specific flight zone that is located after the current position of the unmanned aerial vehicle and through which the predetermined flight route passes.

There are multiple methods for determining, from the predetermined flight route according to the current position, the at least one specific flight zone that is to be entered. For example, the flight control apparatus prestores a specific flight zone map of an area in which the predetermined flight route is located, and the specific flight zone map includes boundary information of all specific flight zones in the area. The flight control apparatus searches, according to the predetermined flight route, the specific flight zone map for a specific flight zone through which the predetermined flight route passes.

In an actual application, the flight control apparatus may not prestore the specific flight zone map. Instead, after the predetermined flight route is obtained, the flight control apparatus detects whether the specific flight zone map of the area in which the predetermined flight route is located is stored. If no specific flight zone map is stored, the flight control apparatus downloads the specific flight zone map of the area in which the predetermined flight route is located from the server. If the flight control apparatus stores the specific flight zone map, preferably, the flight control apparatus further updates the specific flight zone map at an interval of preset duration.

For another example, the flight control apparatus is an aerial remote controller, and the aerial remote controller has a digital display interface. A digital map is displayed on a screen of the aerial remote controller. A whole geographic area in the digital map is divided at a specific granularity. Partial areas are specific flight zones. The aerial remote controller receives a flight route entered in the digital map by a remote control person, so as to determine a specific flight zone through which the flight route passes in the digital map.

Certainly, the foregoing description is merely an example and constitutes no limitation herein.

102. Send application information and information about the specific flight zone to a server.

In this embodiment, the application information is used to apply for a flight clearance to enter the specific flight zone. The application information may include multiple types of content. For example, the application information includes identity information of the unmanned aerial vehicle, for example, at least one of a type identification code of the unmanned aerial vehicle, a machine serial number of the unmanned aerial vehicle, or a user identity corresponding to the unmanned aerial vehicle; or includes flight information of the unmanned aerial vehicle, for example, the current position of the aerial vehicle and/or a scheduled flight time in the specific flight zone. The current position of the aerial vehicle may be a current longitude and latitude of the aerial vehicle, a current area in which the aerial vehicle is located, or other position information, and this is not limited herein.

In an actual application, when the server still needs other information to review whether to allocate the flight clearance to the unmanned aerial vehicle, the application information may further include information required by the server. For example, the application information further includes a machine certificate of the unmanned aerial vehicle, and the machine certificate includes at least one piece of information of a validity period of the unmanned aerial vehicle or a flight violation/law-breaking situation of the unmanned aerial vehicle. Certainly, the foregoing description is merely an example and constitutes no limitation.

The information about the specific flight zone is used to indicate the specific flight zone. The information about the specific flight zone identifies the specific flight zone in multiple manners. For example, the information about the specific flight zone includes four radio-frequency tags, so as to indicate a rectangular area whose four vertices are the four radio-frequency tags. For another example, the digital map is divided into multiple areas at a specific division granularity of longitude and latitude values. The information about the specific flight zone is used to indicate one of the multiple areas.

103. Send a flight instruction when a flight clearance sent by the server is received, so that the unmanned aerial vehicle enters the specific flight zone according to the flight instruction.

After the flight control apparatus sends the application information and the information about the specific flight zone to the server, the server determines, according to the application information and the information about the specific flight zone, whether to allocate the flight clearance to the flight control apparatus. If the server determines to allocate the flight clearance, the server sends the flight clearance to the flight control apparatus.

When the flight control apparatus is an aerial vehicle controller, the aerial vehicle controller sends a flight instruction, to control an aerial physical apparatus to enter the specific flight zone according to the flight instruction. When the flight control apparatus is an aerial remote controller, the aerial remote controller sends a flight instruction to the aerial vehicle controller, and the aerial vehicle controller controls, according to the flight instruction, the aerial physical apparatus to enter the specific flight zone.

In this embodiment, in a flight process of an unmanned aerial vehicle, a specific flight zone that is to be entered is determined, a flight clearance for the specific flight zone is applied for from a server, and after a flight clearance from the server is received, the unmanned aerial vehicle is controlled to enter the specific flight zone. In this way, the unmanned aerial vehicle can change a flight route as required in the flight process, instead of being limited to flying strictly according to an approved flight route as described in the background. This can significantly improve flexibility of a flight route of the unmanned aerial vehicle.

In this embodiment, there are multiple methods for determining the specific flight zone to be entered by the unmanned aerial vehicle, and several methods are described as examples below.

Example 1

Figure 2:
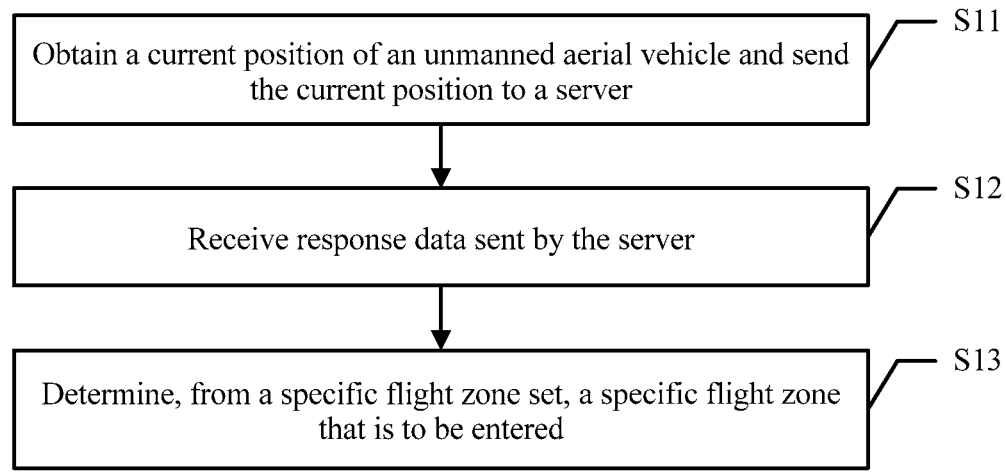
FIG. 2 is a schematic flowchart of an embodiment of determining a specific flight zone to be entered by an unmanned aerial vehicle in a flight control method according to the present invention.

As shown in FIG. 2, the determining a specific flight zone to be entered by the unmanned aerial vehicle includes:

S11. Obtain a current position of the unmanned aerial vehicle and send the current position to the server.

Specifically, when the unmanned aerial vehicle is flying, the flight control apparatus obtains the current position of the unmanned aerial vehicle at an interval of preset duration; or the flight control apparatus obtains the current position of the unmanned aerial vehicle at a preset time point. Certainly, the foregoing description is merely an example and constitutes no limitation. After obtaining the current position of the unmanned aerial vehicle, the flight control apparatus sends the current position to the server, so that the server can query, according to the current position of the unmanned aerial vehicle, whether there is a specific flight zone near the current position.

S12. Receive response data sent by the server.

The response data includes information about a specific flight zone set, and a distance between each specific flight zone in the specific flight zone set and the current position is less than a preset value.

Specifically, the specific flight zone set in the response data may include all specific flight zones that are obtained by the server according to the current position of the unmanned aerial vehicle and that have distances less than the preset value from the current position. Alternatively, the server may organize a flight route of the unmanned aerial vehicle according to multiple current positions sent by the unmanned aerial vehicle, and predict, according to the flight route, a set of a specific flight zones to be entered by the unmanned aerial vehicle in an area whose center is the current position and radius is a distance of the preset value. Certainly, the foregoing is merely an example and constitutes no limitation.

The preset value may be set by the server by default. Alternatively, the flight control apparatus may send the preset value together with the current position of the unmanned aerial vehicle to the server. This is not limited herein.

The information about the specific flight zone set is used to indicate a boundary of each specific flight zone in the set.

S13. Determine, from a specific flight zone set, the specific flight zone that is to be entered.

There are multiple methods for determining, by the flight control apparatus from the specific flight zone set, the specific flight zone that is to be entered.

For example, the flight control apparatus is an aerial remote controller, and controls the flight route of the unmanned aerial vehicle in real time. A display is disposed in the aerial remote controller. Response data received by the aerial remote controller includes map information of a preset area. The current position of the unmanned aerial vehicle and each specific flight zone in the specific flight zone set are located in the preset area. After receiving the response data, the aerial remote controller displays a map of the preset area on the display according to the response data. The current position of the unmanned aerial vehicle and the boundary of each specific flight zone in the specific flight zone set are highlighted in the map, so that a user who operates the aerial remote controller can select the specific flight zone that is to be entered.

The aerial remote controller receives a designation of at least one specific flight zone in the specific flight zone set, and determines the designated at least one specific flight zone as the specific flight zone that is to be entered. There are multiple methods for receiving the designation of the specific flight zone. For example, a touchscreen is further disposed in the display of the aerial remote controller, and the aerial remote controller receives the designation of the specific flight zone by receiving a touch on each specific flight zone. For another example, an option list is further displayed on the display of the aerial remote controller. Options are respectively specific flight zones in the specific flight zone set. The aerial remote controller determines, by receiving a selection of the options, the specific flight zone that is to be entered.

Example 2

In this embodiment, a detector is disposed in the unmanned aerial vehicle, and is configured to detect, when the unmanned aerial vehicle is flying, whether a boundary identifier of the specific flight zone appears in a detection range of the detector. The determining a specific flight zone to be entered by the unmanned aerial vehicle includes: when a boundary identifier that is of a specific flight zone and that is detected by the detector is received, determining a specific flight zone indicated by the boundary identifier as the specific flight zone that is to be entered.

Specifically, the boundary identifier may be a radio-frequency tag or a two-dimensional code, and is not limited herein.

The foregoing describes the flight control method of the present invention, and the following describes a flight clearance method of the present invention.

Figure 3:
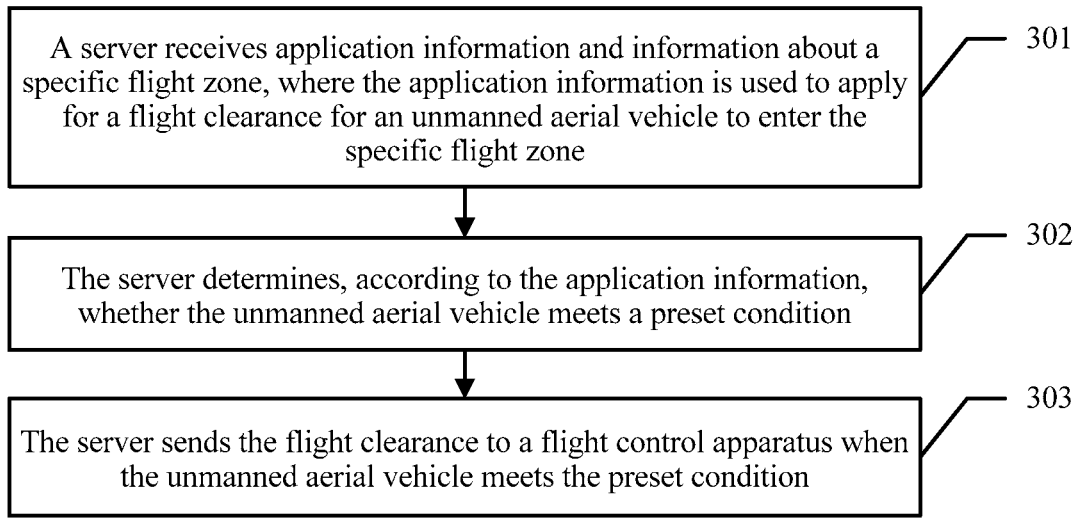
FIG. 3 is a flowchart of an embodiment of a flight clearance method according to the present invention.

As shown in FIG. 3, FIG. 3 is a flowchart of an embodiment of a flight clearance method according to the present invention. In this embodiment, the flight clearance method includes the following steps.

301. A server receives application information and information about a specific flight zone, where the application information is used to apply for a flight clearance for an unmanned aerial vehicle to enter the specific flight zone.

302. The server determines, according to the application information, whether the unmanned aerial vehicle meets a preset condition.

In this embodiment, the specific flight zone is a flight zone that can be entered by an unmanned aerial vehicle only by using a flight clearance, for example, a zone related to military affairs, safety, or commercial interests. A flight control apparatus sends the application information to the server, to apply for the flight clearance for the unmanned aerial vehicle to enter the specific flight zone. The information about the specific flight zone is used to indicate a specific flight zone that the flight control apparatus applies to enter.

Optionally, the application information further includes a machine certificate of the unmanned aerial vehicle, and the machine certificate includes at least one piece of information of a validity period of the unmanned aerial vehicle or a flight violation/law-breaking situation of the unmanned aerial vehicle. Certainly, the foregoing description is merely an example and constitutes no limitation.

In an actual application, different specific flight zones may require different qualifications of unmanned aerial vehicles that can enter the specific flight zones. In this embodiment, the server stores a preset condition corresponding to each specific flight zone. After receiving the application information and the information about the specific flight zone, the server determines whether the application information meets a preset condition corresponding to the specific flight zone.

In this embodiment, there may be multiple preset conditions corresponding to the specific flight zone.

For example, for a first specific flight zone, a preset condition of the first specific flight zone stored in the server includes: the unmanned aerial vehicle has a preset certificate that is within a validity period. After receiving application information for the first specific flight zone, the server determines that the unmanned aerial vehicle meets the preset condition when the server detects that the application information includes information about the preset certificate, and the preset certificate is within a validity period.

For another example, for a first specific flight zone, a preset condition of the first specific flight zone stored in the server includes: the first specific flight zone is open to the unmanned aerial vehicle only in a preset time period. After receiving application information for the first specific flight zone, the server determines that the unmanned aerial vehicle meets the preset condition when the server detects that a flight time that is applied for and that is included in the application information is in the preset time period.

For another example, the server further stores a correspondence between a specific flight zone and a network access IP address. Because the application information is sent to the server in a form of a data packet, the server may obtain a network access IP address of the unmanned aerial vehicle when receiving the data packet. This belongs to the prior art, and details are not described herein. For a first specific flight zone, after receiving application information for the first specific flight zone, the server obtains the network access IP address of the unmanned aerial vehicle, and determines, according to the correspondence, whether the IP address of the unmanned aerial vehicle is corresponding to the first specific flight zone. The server determines that the unmanned aerial vehicle meets the preset condition when the server detects that the network access IP address of the unmanned aerial vehicle is corresponding to the first specific flight zone. In this way, the server can avoid a possibility that the unmanned aerial vehicle implements a malicious intention by means of network access IP address spoofing.

Optionally, the server triggers a preset safety control action when determining that the IP address of the unmanned aerial vehicle is not corresponding to the specific flight zone. There are multiple safety control actions. For example, the server does not send the flight clearance, and adds the unmanned aerial vehicle to a blacklist of the specific flight zone.

Optionally, in this embodiment, the server includes a gateway server and at least two subservers. Different subservers are configured to process application information for different types of specific flight zones, and each subserver stores a preset condition corresponding to a specific flight zone of a type processed by the subserver. For example, one subserver is configured to process application information for a specific flight zone of a military affairs type, and one subserver is configured to process application information for a specific flight zone of a commercial type.

After receiving the application information and the information about the specific flight zone, the gateway server determines a type of the specific flight zone, and sends the application information and the information about the specific flight zone to a subserver corresponding to the type of the specific flight zone. After receiving the application information and the information about the specific flight zone, the subserver determines, according to the application information, whether the unmanned aerial vehicle meets the preset condition. In this way, when receiving a large quantity and many types of application information for specific flight zones, the server can more easily manage application information for each specific flight zone.

303. The server sends the flight clearance to a flight control apparatus when the unmanned aerial vehicle meets the preset condition.

When it is determined that the unmanned aerial vehicle meets the preset condition, that is, when it is determined that the unmanned aerial vehicle can enter a predetermined flight zone that is applied for by the flight control apparatus, the server sends a flight clearance to the flight control apparatus, so that the flight control apparatus sends a flight instruction, and the unmanned aerial vehicle enters the predetermined flight zone according to the instruction.

According to different attributes of specific flight zones, the server may identify the specific flight zones as at least the following three types: free/commerce/mandatory. Free indicates a flight-free area that is not limited or monitored. Commerce indicates an area requiring a commercial payment. Mandatory indicates an area in which a flight is limited and needs to be monitored. Therefore, a clearance file sent by the server varies with an attribute of a specific flight zone. There are multiple types of clearance files for specific flight zones of each attribute.

For example, content and entries included in a clearance file for a free area are an area range marked by digital geographical coordinates, an area type, valid information about a service side that approves and issues the clearance, and the like.

For example, content and entries included in a clearance file for a commerce area are an area range marked by digital geographical coordinates, an area type, valid information about a service side that approves and issues the clearance, valid information about an area management party, flight execution information, a commercial credential, and the like.

For example, content and entries included in a clearance file for a mandatory area are an area range marked by digital geographical coordinates, an area type, valid information about a service side that approves and issues the clearance, valid information about an area management party, flight execution information, an approval and issue party/verification party of the foregoing valid information, and the like.

Certainly, the foregoing description of the clearance file is merely an example and constitutes no limitation.

In the prior art, a flight clearance of an unmanned aerial vehicle is obtained through application to a relevant department, and an entire application process is time-consuming and labor-consuming. In this embodiment, the server collects and reviews an application for a flight clearance for each unmanned aerial vehicle to enter a predetermined flight zone. This shortens review duration, facilitates an application that is filed in real time by the unmanned aerial vehicle as required in a flight process, and improves flexibility of a flight route of the unmanned aerial vehicle.

In this embodiment, the server determines, according to the application information sent by the flight control apparatus, whether the unmanned aerial vehicle meets the preset condition. Optionally, in this embodiment, the server further obtains accessory information of the unmanned aerial vehicle, and determines, according to the application information and the accessory information, whether the unmanned aerial vehicle meets the preset condition.

The accessory information may be at least one of an examination record of the unmanned aerial vehicle, an aerial vehicle safety accident rate of the type of the unmanned aerial vehicle, a safety record of a user corresponding to the unmanned aerial vehicle, commercial credit of a user corresponding to the unmanned aerial vehicle, or an account balance corresponding to the unmanned aerial vehicle. Certainly, there may be other accessory information, and this is not limited herein. The accessory information of the unmanned aerial vehicle may be prestored in the server, and the server obtains the accessory information from a memory inside the server. Alternatively, the server may obtain the accessory information from another server that stores the accessory information of the unmanned aerial vehicle, and this is not limited herein.

Correspondingly, in this embodiment, the preset condition includes a first subcondition and a second subcondition. When determining whether the unmanned aerial vehicle meets the preset condition, the server determines, according to the application information, whether the unmanned aerial vehicle meets the first subcondition; and determines, according to the accessory information, whether the unmanned aerial vehicle meets the second subcondition. It is determined that the unmanned aerial vehicle meets the preset condition only when the unmanned aerial vehicle meets both the first subcondition and the second subcondition, and the flight clearance for the unmanned aerial vehicle to enter the specific flight zone that is applied for is sent to the flight control apparatus.

For example, for a third specific flight zone, a preset condition of the third specific flight zone stored in the server includes a first subcondition: a user account for the third specific flight zone is created for the unmanned aerial vehicle, and includes a second subcondition: a safety accident rate of the unmanned aerial vehicle is lower than a preset value. After receiving application information for the third specific flight zone, the server obtains the safety accident rate of the unmanned aerial vehicle from the memory according to identity information of the unmanned aerial vehicle in the application information. When detecting that the application information includes information about a user account that is created for the third specific flight zone for an unmanned aerial vehicle, and a safety accident rate of the unmanned aerial vehicle is lower than the preset value, the server determines that the unmanned aerial vehicle meets the preset condition.

Optionally, in this embodiment, the server stores a specific flight zone map, and the map includes a boundary position of each specific flight zone. Before the server receives an application sent by the flight control apparatus, when the server receives the current position of the unmanned aerial vehicle, the server determines the specific flight zone set from the specific flight zone map. The specific flight zone set includes all specific flight zones that have distances less than the preset value from the current position. Alternatively, the server organizes a flight route of the unmanned aerial vehicle according to multiple current positions sent by the unmanned aerial vehicle, and predicts, according to the flight route, a set of specific flight zones to be entered by the unmanned aerial vehicle in an area whose center is the current position and radius is a distance of the preset value. The server sends response data to the flight control apparatus, and the response data includes information about the specific flight zone set.

Optionally, in this embodiment, when the unmanned aerial vehicle meets the preset condition, the server further stores the received application information and the received information about the specific flight zone, so as to manage the unmanned aerial vehicle subsequently according to the information. Alternatively, when the unmanned aerial vehicle does not meet the preset condition, the server may also store the application information of the unmanned aerial vehicle that does not meet the preset condition and the information about the specific flight zone.

There are multiple methods for managing the unmanned aerial vehicle according to the application information and the information about the specific flight zone. For example, a maintenance apparatus is disposed in the predetermined flight zone, and is configured to detect in real time an identifier of an unmanned aerial vehicle that appears in a detection area of the maintenance apparatus. When detecting an identifier of an unmanned aerial vehicle, the maintenance apparatus sends query information to the server. The query information includes information about a specific flight zone and the identifier of the unmanned aerial vehicle that appears in the specific flight zone.

The server receives the query information sent by the maintenance apparatus, obtains a query result according to the query information, and sends the query result to the maintenance apparatus. The query result is used to indicate whether the unmanned aerial vehicle has a flight clearance for the specific flight zone. Specifically, there are multiple methods for obtaining the query result by the server according to the query information. For example, the server stores, according to the received application information and the received information about the specific flight zone, a correspondence between each specific flight zone and an unmanned aerial vehicle that has a flight clearance for the specific flight zone. When receiving the query information, the server determines whether there is a correspondence between the unmanned aerial vehicle in the query information and the specific flight zone. If there is a correspondence, it is determined that the unmanned aerial vehicle has a flight clearance for the specific flight zone. Certainly, the foregoing is merely an example and constitutes no limitation.

Optionally, the server may further record an unmanned aerial vehicle that does not have a flight clearance for the specific flight zone, so as to manage the unmanned aerial vehicle subsequently.

The foregoing describes the flight clearance method of the present invention, and the following describes a flight safety maintenance method of the present invention.

Figure 4:
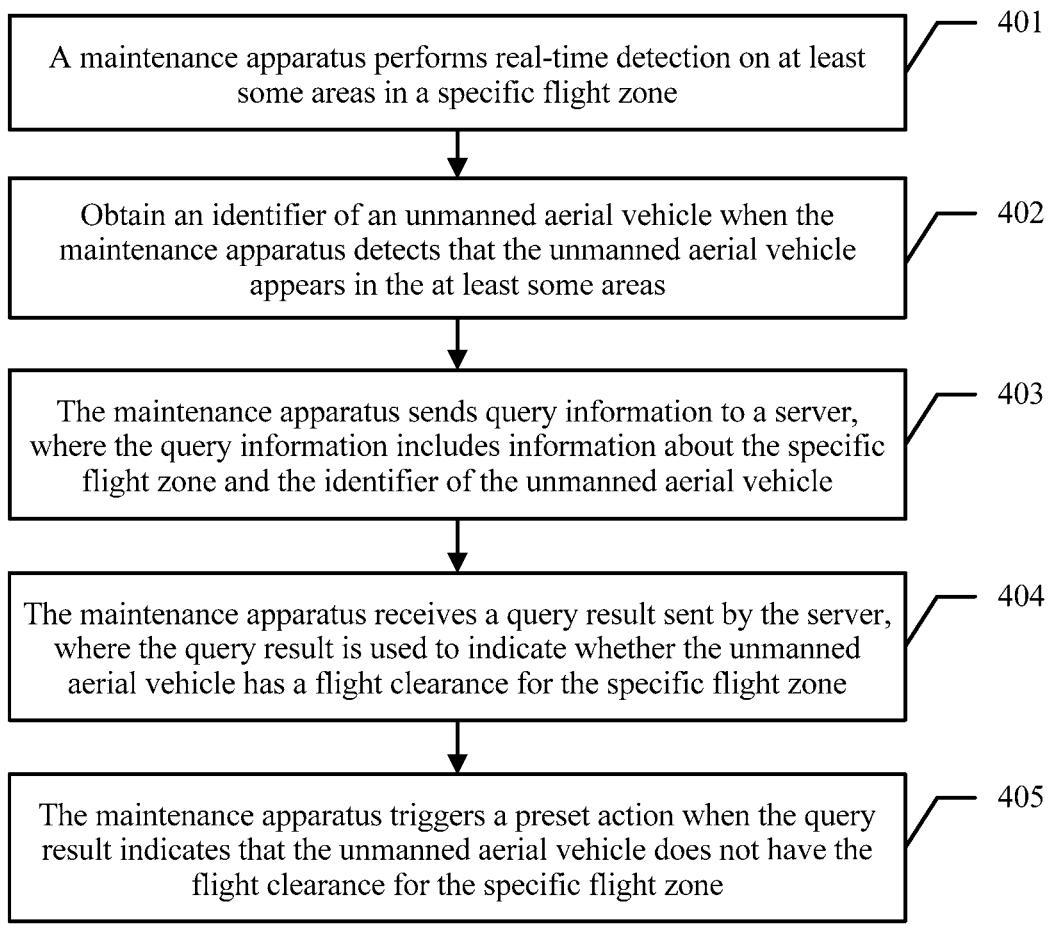
FIG. 4 is a flowchart of an embodiment of a flight safety maintenance method according to the present invention.

As shown in FIG. 4, FIG. 4 is a flowchart of an embodiment of a flight safety maintenance method according to the present invention. In this embodiment, the flight safety maintenance method includes the following steps.

401. A maintenance apparatus performs real-time detection on at least some areas in a specific flight zone.

In this embodiment, the maintenance apparatus may be a detector, or another apparatus that can obtain an identifier of an unmanned aerial vehicle, and this is not limited herein. A detection range of the maintenance apparatus falls within the specific flight zone, and may be a part of the specific flight zone or the entire specific flight zone. In a time period when an unmanned aerial vehicle can enter the specific flight zone only by using a flight clearance, the maintenance apparatus performs real-time detection on an area within the detection range.

402. Obtain an identifier of an unmanned aerial vehicle when the maintenance apparatus detects that the unmanned aerial vehicle appears in the at least some areas.

An identifier of an unmanned aerial vehicle is obtained when the unmanned aerial vehicle appears in the detection range of the maintenance apparatus. There are multiple obtaining methods. For example, when the identifier of the unmanned aerial vehicle is a two-dimensional code, the maintenance apparatus scans the two-dimensional code, and uses information obtained after the scanning as the identifier of the unmanned aerial vehicle. For another example, when the identifier of the unmanned aerial vehicle is a radio-frequency tag, the maintenance apparatus identifies the radio-frequency tag by using a radio frequency identification (English: Radio Frequency Identification, RFID for short) technology, and uses information obtained after the identification as the identifier of the unmanned aerial vehicle.

403. The maintenance apparatus sends query information to the server, where the query information includes information about the specific flight zone and the identifier of the unmanned aerial vehicle.

The maintenance apparatus sends the obtained information about the specific flight zone and the identifier of the unmanned aerial vehicle to the server, so that the server queries whether the unmanned aerial vehicle has a flight clearance for the specific flight zone.

404. The maintenance apparatus receives a query result sent by the server, where the query result is used to indicate whether the unmanned aerial vehicle has a flight clearance for the specific flight zone.

405. The maintenance apparatus triggers a preset action when the query result indicates that the unmanned aerial vehicle does not have the flight clearance for the specific flight zone.

When the unmanned aerial vehicle does not have the flight clearance for the specific flight zone, that is, the unmanned aerial vehicle illegally flies in the specific flight zone, the maintenance apparatus triggers the preset action. There are multiple preset actions. For example, the maintenance apparatus may sound an alarm to warn the illegally flying unmanned aerial vehicle.

In this embodiment, a maintenance apparatus is disposed and the maintenance apparatus cooperates with a server, so that an unmanned aerial vehicle that does not have a flight clearance can be further prevented from appearing in a specific flight zone, thereby ensuring flight safety in the specific flight zone.

The foregoing describes the flight control method, the flight clearance method, and the flight safety maintenance method in the embodiments of the present invention. The following describes the flight control apparatus, the server, and the flight safety maintenance apparatus in the embodiments of the present invention.

Figure 5:
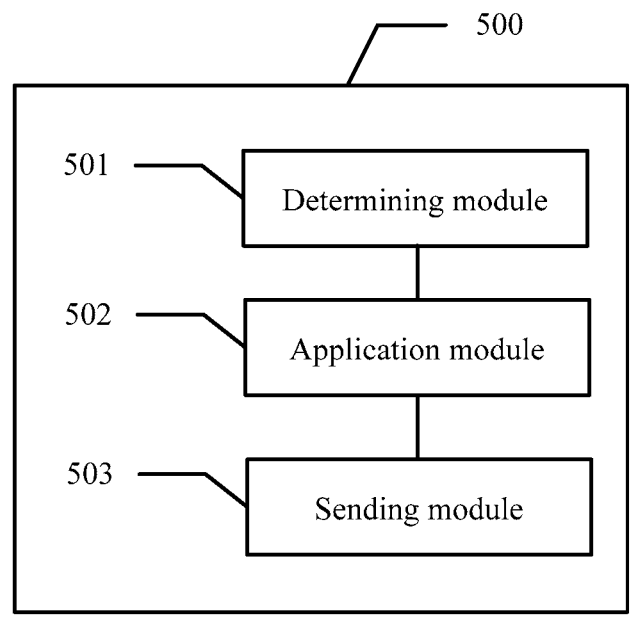
FIG. 5 is a schematic structural diagram of an embodiment of a flight control apparatus according to the present invention.

Referring to FIG. 5, FIG. 5 is a schematic structural diagram of an embodiment of a flight control apparatus 500 according to the present invention. In this embodiment, the flight control apparatus 500 includes:

a determining module 501, configured to determine, when an unmanned aerial vehicle is flying, a specific flight zone to be entered by the unmanned aerial vehicle, where a flight clearance is required for the unmanned aerial vehicle to enter the specific flight zone;

an application module 502, configured to send application information and information about the specific flight zone to a server, where the application information is used to apply for the flight clearance to enter the specific flight zone, and the information about the specific flight zone is used to indicate the specific flight zone; and a sending module 503, configured to send a flight instruction when a flight clearance sent by the server is received, so that the unmanned aerial vehicle enters the specific flight zone according to the flight instruction.

In this embodiment, in a flight process of an unmanned aerial vehicle, a specific flight zone that is to be entered is determined, a flight clearance for the specific flight zone is applied for from a server, and after a flight clearance from the server is received, the unmanned aerial vehicle is controlled to enter the specific flight zone. In this way, the unmanned aerial vehicle can change a flight route as required in the flight process, instead of being limited to flying strictly according to an approved flight route as described in the background. This can significantly improve flexibility of a flight route of the unmanned aerial vehicle.

Optionally, the determining module is specifically configured to: obtain a predetermined flight route of the unmanned aerial vehicle and a current position of the unmanned aerial vehicle; and determine, from the predetermined flight route according to the current position, at least one specific flight zone that is to be entered.

Optionally, the determining module is specifically configured to: obtain a current position of the unmanned aerial vehicle; send the current position to the server; receive response data sent by the server, where the response data includes information about a specific flight zone set, and a distance between each specific flight zone in the specific flight zone set and the current position is less than a preset value; and determine, from the specific flight zone set, the specific flight zone that is to be entered.

Optionally, the determining module is specifically configured to determine, when a boundary identifier that is of a specific flight zone and that is detected by a detector is received, a specific flight zone indicated by the boundary identifier as the specific flight zone that is to be entered, where the detector is located in the unmanned aerial vehicle, and is configured to detect a boundary identifier of a specific flight zone when the unmanned aerial vehicle is flying.

Optionally, the application information includes at least one of a type identification code of the unmanned aerial vehicle, a machine serial number of the unmanned aerial vehicle, a user identity corresponding to the unmanned aerial vehicle, the current position of the unmanned aerial vehicle, or a scheduled flight time of the unmanned aerial vehicle in the specific flight zone.

Figure 6:
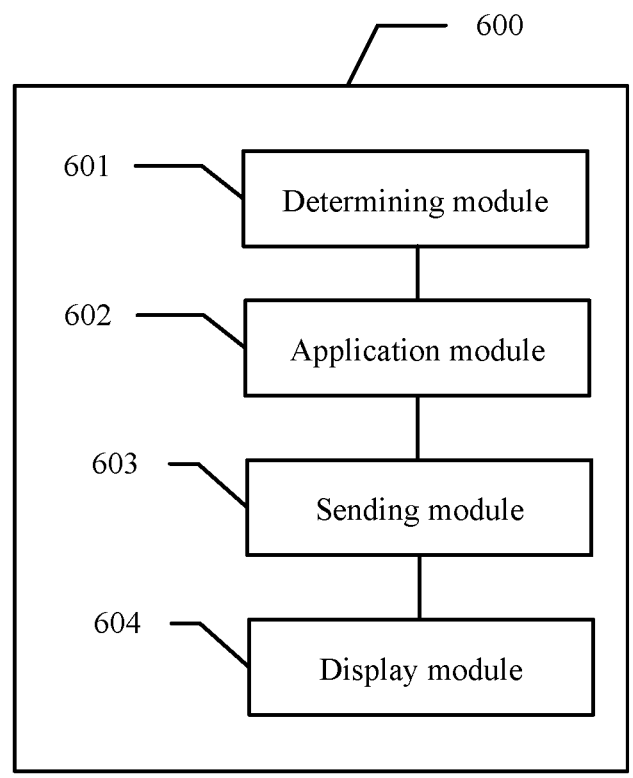
FIG. 6 is a schematic structural diagram of another embodiment of a flight control apparatus according to the present invention.

Referring to FIG. 6, FIG. 6 is a schematic structural diagram of another embodiment of a flight control apparatus 600 according to the present invention. In this embodiment, the flight control apparatus 600 includes:

a determining module 601, configured to determine, when an unmanned aerial vehicle is flying, a specific flight zone to be entered by the unmanned aerial vehicle, where a flight clearance is required for the unmanned aerial vehicle to enter the specific flight zone;

an application module 602, configured to send application information and information about the specific flight zone to a server, where the application information is used to apply for the flight clearance to enter the specific flight zone, and the information about the specific flight zone is used to indicate the specific flight zone; and a sending module 603, configured to send a flight instruction when a flight clearance sent by the server is received, so that the unmanned aerial vehicle enters the specific flight zone according to the flight instruction.

Specifically, in this embodiment, the determining module is specifically configured to: obtain a current position of the unmanned aerial vehicle; send the current position to the server; receive response data sent by the server, where the response data includes information about a specific flight zone set, and a distance between each specific flight zone in the specific flight zone set and the current position is less than a preset value; and determine, from the specific flight zone set, the specific flight zone that is to be entered.

Optionally, in this embodiment, the flight control apparatus 600 is an aerial remote controller, the response data specifically includes map information of a preset area, and the current position of the unmanned aerial vehicle and each specific flight zone in the specific flight zone set are located in the preset area.

The aerial remote controller 600 further includes:

a display module 604, configured to display a map of the preset area after the response data sent by the server is received, where the current position of the unmanned aerial vehicle and a boundary of each specific flight zone in the specific flight zone set are highlighted in the map.

The determining module 601 is specifically configured to: receive a designation of at least one specific flight zone in the specific flight zone set, and determine the designated at least one specific flight zone as the specific flight zone that is to be entered.

In this way, a specific position of a specific flight zone may be intuitively displayed to a user, so that the user selects a specific flight zone that is to be entered. This can improve user experience of an unmanned aerial vehicle.

The present invention further provides an unmanned aerial vehicle, and the unmanned aerial vehicle includes any one of the flight control apparatuses described above.

The foregoing describes the flight control apparatus of the present invention, and the following describes a server of the present invention.

Figure 7:
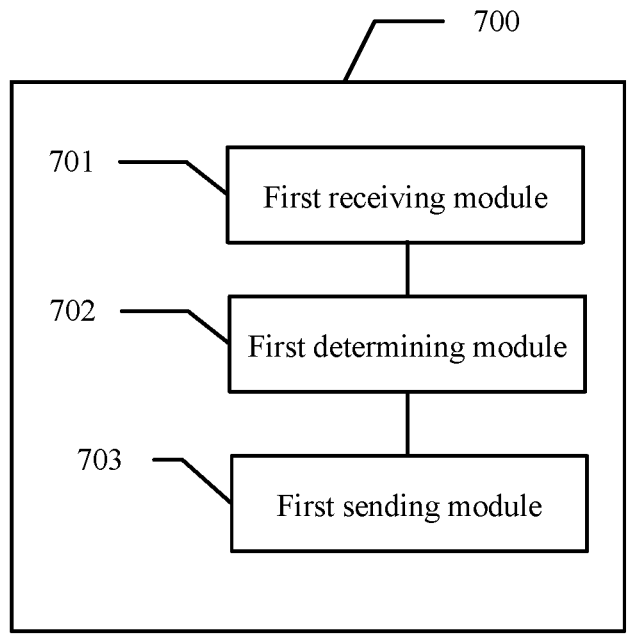
FIG. 7 is a schematic structural diagram of an embodiment of a server according to the present invention.

Referring to FIG. 7, FIG. 7 is a schematic structural diagram of an embodiment of a server according to the present invention. In this embodiment, the server includes:

a first receiving module 701, configured to receive application information and information about a specific flight zone, where the application information is used to apply for a flight clearance for an unmanned aerial vehicle to enter the specific flight zone, and the server stores a preset condition corresponding to the specific flight zone;

a first determining module 702, configured to determine, according to the application information, whether the unmanned aerial vehicle meets the preset condition; and a first sending module 703, configured to send the flight clearance when the first determining module determines that the unmanned aerial vehicle meets the preset condition.

In the prior art, a flight clearance of an unmanned aerial vehicle is obtained through application to a relevant department, and an entire application process is time-consuming and labor-consuming. In this embodiment, the server collects and reviews an application for a flight clearance for each unmanned aerial vehicle to enter a predetermined flight zone. This shortens review duration, facilitates an application that is filed in real time by the unmanned aerial vehicle as required in a flight process, and improves flexibility of a flight route of the unmanned aerial vehicle.

Optionally, the application information includes at least one of a type identification code of the unmanned aerial vehicle, a machine serial number of the unmanned aerial vehicle, a user identity corresponding to the unmanned aerial vehicle, a current position of the unmanned aerial vehicle, or a flight time of the unmanned aerial vehicle in the specific flight zone; and the information about the specific flight zone is used to indicate the specific flight zone to be entered by the unmanned aerial vehicle.

Figure 8:
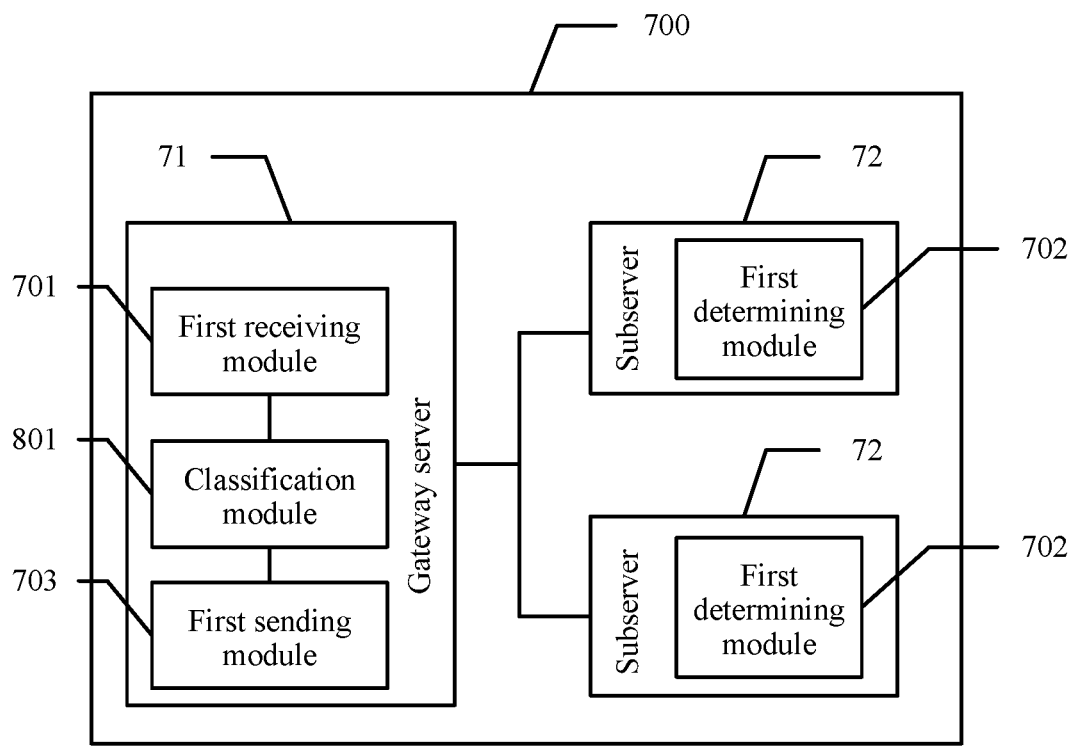
FIG. 8 is a schematic structural diagram of another embodiment of a server according to the present invention.

Optionally, as shown in FIG. 8, the server 700 includes a gateway server 71 and at least two subservers 72. Different subservers 72 are configured to process application information for different types of specific flight zones. The first receiving module 701 and the first sending module 703 are located in the gateway server 71. The subserver includes the first determining module 702.

The gateway server further includes a classification module 801, configured to: determine a type of the specific flight zone, and send the application information and the information about the specific flight zone to a subserver 72 corresponding to the type of the specific flight zone, so that the first determining module 702 in the subserver determines, according to the application information, whether the unmanned aerial vehicle meets the preset condition.

Figure 9:
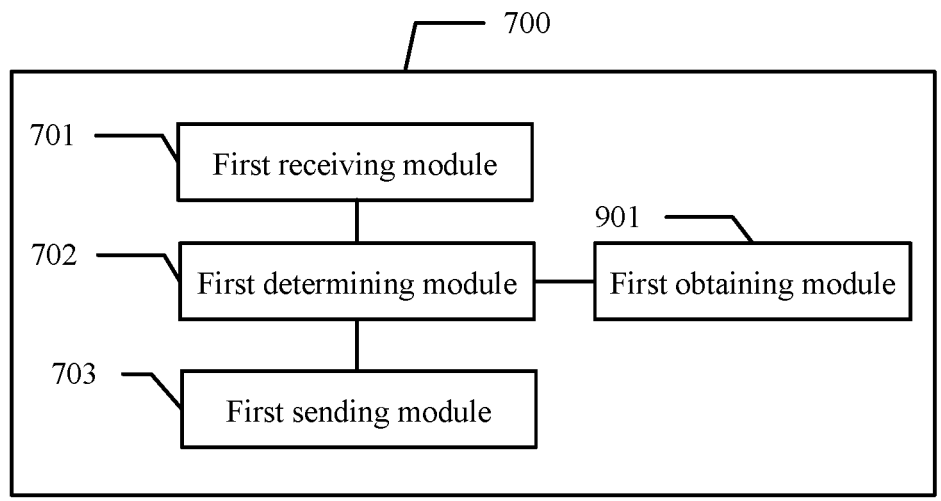
FIG. 9 is a schematic structural diagram of another embodiment of a server according to the present invention.

Optionally, as shown in FIG. 9, the preset condition includes a first subcondition and a second subcondition, and the server further includes:

a first obtaining module 901, configured to obtain accessory information of the unmanned aerial vehicle, where the accessory information of the unmanned aerial vehicle includes at least one of an examination record of the unmanned aerial vehicle, an aerial vehicle safety accident rate of the type of the unmanned aerial vehicle, a safety record of a user corresponding to the unmanned aerial vehicle, commercial credit of a user corresponding to the unmanned aerial vehicle, or an account balance corresponding to the unmanned aerial vehicle.

The first determining module 702 is specifically configured to: determine, according to the application information, whether the unmanned aerial vehicle meets the first subcondition; determine, according to the accessory information, whether the unmanned aerial vehicle meets the second subcondition; and when the unmanned aerial vehicle meets both the first subcondition and the second subcondition, determine that the unmanned aerial vehicle meets the preset condition.

Optionally, the server stores a correspondence between a specific flight zone and a network access IP address.

The first determining module 702 is specifically configured to: obtain a network access IP address of the unmanned aerial vehicle; determine, according to the correspondence, whether the network access IP address of the unmanned aerial vehicle is corresponding to the specific flight zone; and when the network access IP address of the unmanned aerial vehicle is corresponding to the specific flight zone, determine that the unmanned aerial vehicle meets the preset condition.

Figure 10:
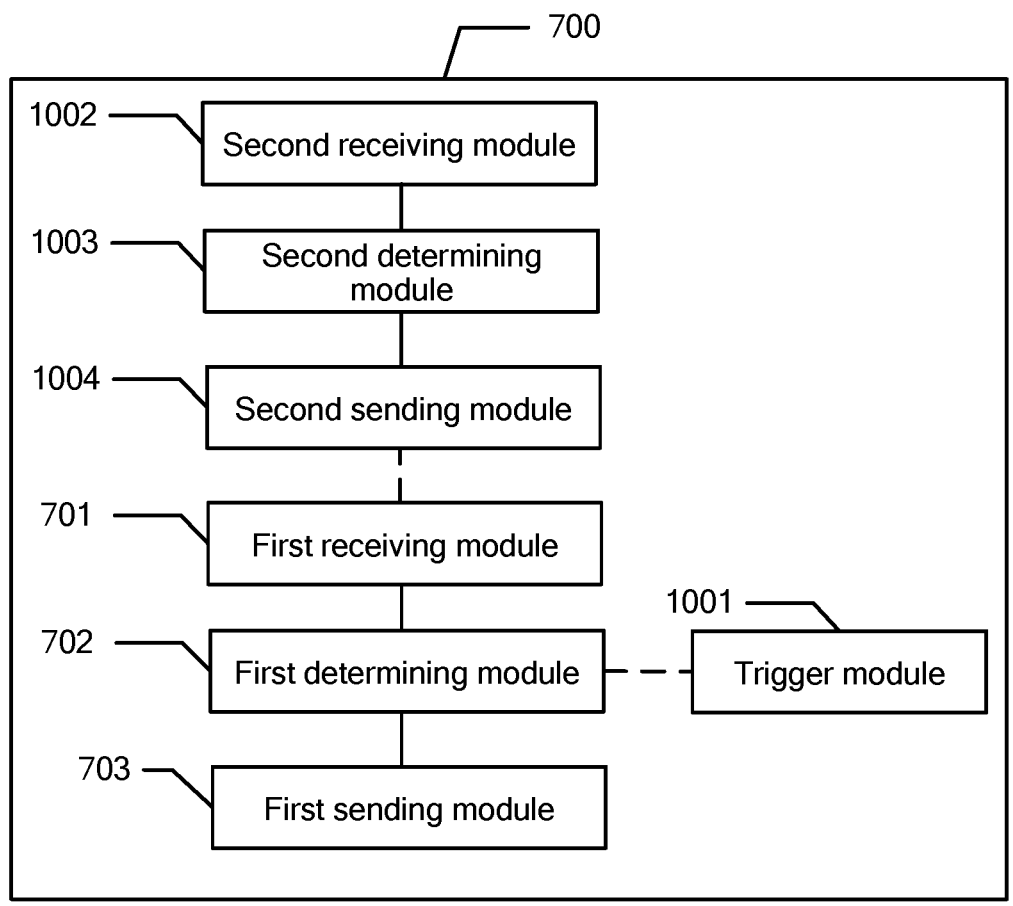
FIG. 10 is a schematic structural diagram of another embodiment of a server according to the present invention.

Further, optionally, as shown in FIG. 10, the server 700 further includes:

a trigger module 1001, configured to trigger a preset safety control action when it is determined that the network access IP address of the unmanned aerial vehicle is not corresponding to the specific flight zone.

Optionally, as shown in FIG. 10, the server 700 further includes:

a second receiving module 1002, configured to receive a current position of the unmanned aerial vehicle;

a second determining module 1003, configured to determine a specific flight zone set according to the current position, where a distance between each specific flight zone in the specific flight zone set and the current position is less than a preset value; and a second sending module 1004, configured to send response data, where the response data includes information about the specific flight zone set.

Figure 11:
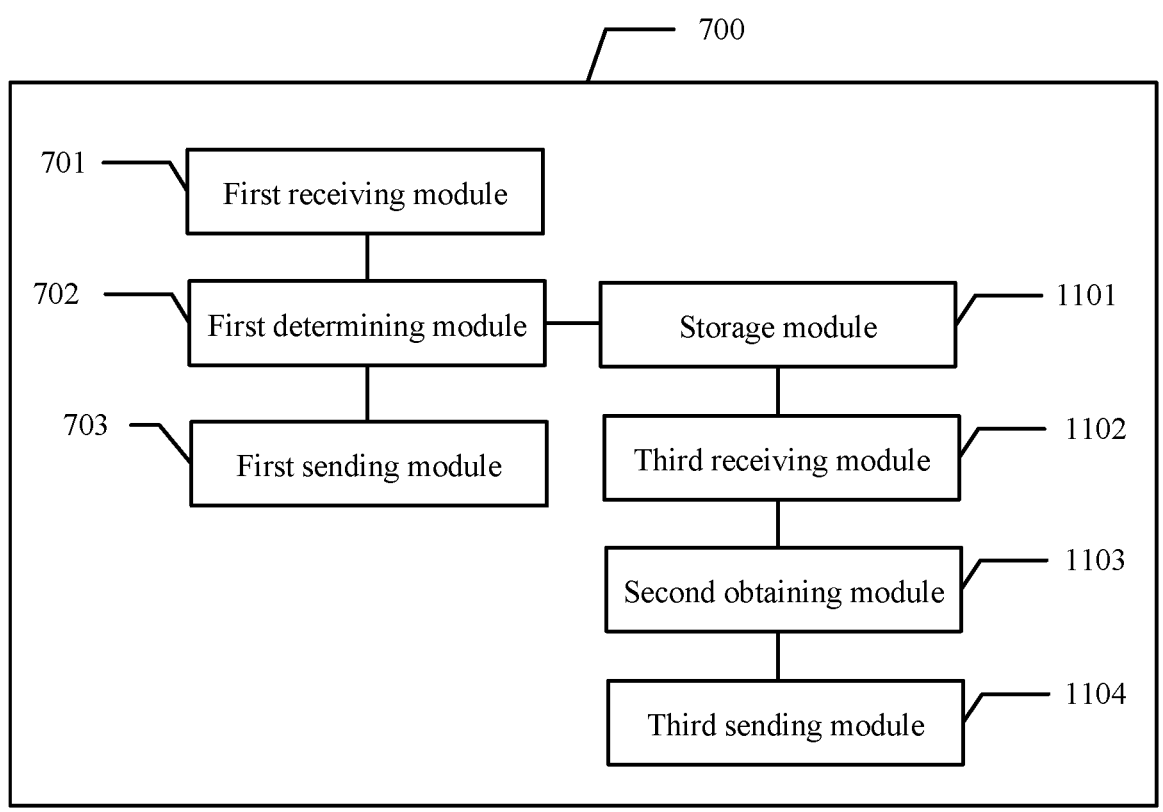
FIG. 11 is a schematic structural diagram of another embodiment of a server according to the present invention.

Optionally, as shown in FIG. 11, the server 700 further includes:

a storage module 1101, configured to: when the unmanned aerial vehicle meets the preset condition, store the application information of the unmanned aerial vehicle and the information about the specific flight zone;

a third receiving module 1102, configured to receive query information sent by a maintenance apparatus, where the query information includes information about a specific flight zone and an identifier of an unmanned aerial vehicle that appears in the specific flight zone;

a second obtaining module 1103, configured to obtain a query result according to the query information, where the query result is used to indicate whether the unmanned aerial vehicle has a flight clearance for the specific flight zone; and a third sending module 1104, configured to send the query result to the maintenance apparatus.

The foregoing describes the server of the present invention, and the following describes a flight safety maintenance apparatus of the present invention.

Figure 12:
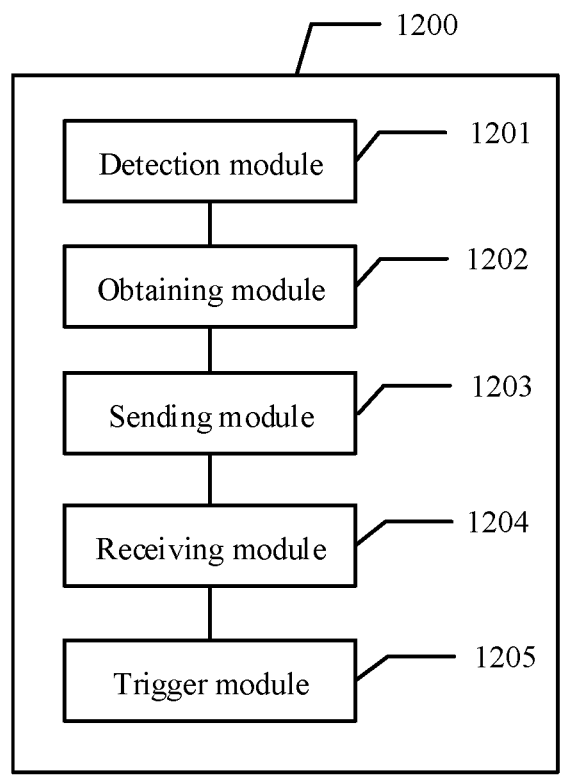
FIG. 12 is a schematic structural diagram of an embodiment of a flight safety maintenance apparatus according to the present invention.

Referring to FIG. 12, FIG. 12 is a schematic structural diagram of an embodiment of a flight safety maintenance apparatus 1200 according to the present invention. In this embodiment, the flight safety maintenance apparatus 1200 includes:

a detection module 1201, configured to perform real-time detection on at least some areas in a specific flight zone;

an obtaining module 1202, configured to obtain an identifier of an unmanned aerial vehicle when the maintenance apparatus detects that the unmanned aerial vehicle appears in the at least some areas;

a sending module 1203, configured to send query information to the server, where the query information includes information about the specific flight zone and the identifier of the unmanned aerial vehicle;

a receiving module 1204, configured to receive a query result sent by the server, where the query result is used to indicate whether the unmanned aerial vehicle has a flight clearance for the specific flight zone; and a trigger module 1205, configured to trigger a preset action when the query result indicates that the unmanned aerial vehicle does not have the flight clearance for the specific flight zone.

The foregoing describes the flight control apparatus, the server, the flight safety maintenance apparatus, and the unmanned aerial vehicle in the embodiments of the present invention from a perspective of a unitized functional entity. The following describes the flight control apparatus, the server, the flight safety maintenance apparatus, and the unmanned aerial vehicle in the embodiments of the present invention from a perspective of hardware processing.

Figure 13:
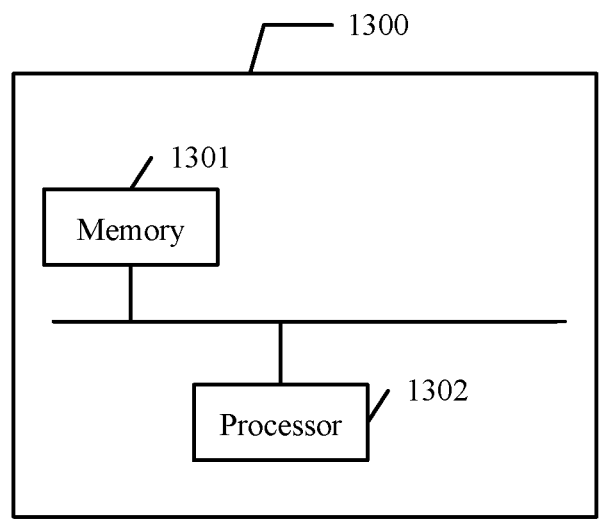
FIG. 13 is a schematic structural diagram of an embodiment of an aerial vehicle controller according to the present invention.

Referring to FIG. 13, FIG. 13 is a schematic structural diagram of an embodiment of an aerial vehicle controller according to the present invention. In this embodiment, the aerial vehicle controller 1300 includes:

a processor 1301 and a memory 1302 coupled to the processor 1301, where the processor 1301 reads a computer program stored in the memory 1302, to execute the following operations:

determining, when an unmanned aerial vehicle is flying, a specific flight zone to be entered by the unmanned aerial vehicle, where a flight clearance is required for the unmanned aerial vehicle to enter the specific flight zone;

sending application information and information about the specific flight zone to a server, where the application information is used to apply for the flight clearance to enter the specific flight zone, and the information about the specific flight zone is used to indicate the specific flight zone; and sending a flight instruction when a flight clearance sent by the server is received, so that the unmanned aerial vehicle enters the specific flight zone according to the flight instruction.

In this embodiment, in a flight process of an unmanned aerial vehicle, an aerial vehicle controller determines a specific flight zone that is to be entered, applies to a server for a flight clearance for the specific flight zone, and after receiving a flight clearance from the server, controls the unmanned aerial vehicle to enter the specific flight zone. In this way, the unmanned aerial vehicle can change a flight route as required in the flight process, instead of being limited to flying strictly according to an approved flight route as described in the background. This can significantly improve flexibility of a flight route of the unmanned aerial vehicle.

Optionally, the determining a specific flight zone to be entered by the unmanned aerial vehicle includes:

obtaining a predetermined flight route of the unmanned aerial vehicle and a current position of the unmanned aerial vehicle; and determining, from the predetermined flight route according to the current position, at least one specific flight zone that is to be entered.

Optionally, the determining a specific flight zone to be entered by the unmanned aerial vehicle includes:

obtaining a current position of the unmanned aerial vehicle;

sending the current position to the server;

receiving response data sent by the server, where the response data includes information about a specific flight zone set, and a distance between each specific flight zone in the specific flight zone set and the current position is less than a preset value; and determining, from the specific flight zone set, the specific flight zone that is to be entered.

Optionally, the aerial vehicle controller is an aerial remote controller, the response data specifically includes map information of a preset area, and the current position of the unmanned aerial vehicle and each specific flight zone in the specific flight zone set are located in the preset area.

After receiving the response data sent by the server, the processor 1301 is further configured to execute the following operation:

displaying a map of the preset area, where the current position of the unmanned aerial vehicle and a boundary of each specific flight zone in the specific flight zone set are highlighted in the map.

The determining, from the specific flight zone set, the specific flight zone that is to be entered includes:

receiving a designation of at least one specific flight zone in the specific flight zone set; and determining the designated at least one specific flight zone as the specific flight zone that is to be entered.

Optionally, the determining a specific flight zone to be entered by the unmanned aerial vehicle includes:

determining, when a boundary identifier that is of a specific flight zone and that is detected by a detector is received, a specific flight zone indicated by the boundary identifier as the specific flight zone that is to be entered, where the detector is located in the unmanned aerial vehicle, and is configured to detect a boundary identifier of a specific flight zone when the unmanned aerial vehicle is flying.

Optionally, the application information includes at least one of a type identification code of the unmanned aerial vehicle, a machine serial number of the unmanned aerial vehicle, a user identity corresponding to the unmanned aerial vehicle, the current position of the unmanned aerial vehicle, or a scheduled flight time of the unmanned aerial vehicle in the specific flight zone.

The present invention further provides an unmanned aerial vehicle, and the unmanned aerial vehicle includes any one of the flight controllers described above.

Referring to FIG. 13, FIG. 13 is a schematic structural diagram of an embodiment of a server according to the present invention. In this embodiment, the server 1300 includes:

a processor 1301 and a memory 1302 coupled to the processor 1301, where the processor 1301 reads a computer program stored in the memory 1302, to execute the following operations:

receiving application information and information about a specific flight zone, where the application information is used to apply for a flight clearance for an unmanned aerial vehicle to enter the specific flight zone, and the memory stores a preset condition corresponding to the specific flight zone;

determining, according to the application information, whether the unmanned aerial vehicle meets the preset condition; and sending the flight clearance when the unmanned aerial vehicle meets the preset condition.

In the prior art, a flight clearance of an unmanned aerial vehicle is obtained through application to a relevant department, and an entire application process is time-consuming and labor-consuming. In this embodiment, the server collects and reviews an application for a flight clearance for each unmanned aerial vehicle to enter a predetermined flight zone. This shortens review duration, facilitates an application that is filed in real time by the unmanned aerial vehicle as required in a flight process, and improves flexibility of a flight route of the unmanned aerial vehicle.

Optionally, the server includes a gateway server and at least two subservers, and different subservers are configured to process application information for different types of specific flight zones.

The gateway server includes a first processor, and a first memory coupled to the first processor, where the first processor reads a computer program stored in the first memory, to execute the following operations:

receiving the application information and the information about the specific flight zone; determining a type of the specific flight zone; and sending the application information and the information about the specific flight zone to a subserver corresponding to the type of the specific flight zone.

The subserver includes a second processor, and a second memory coupled to the second processor, where the second processor reads a computer program stored in the second memory, to execute the following operations:

receiving the application information and the information about the specific flight zone; and determining, according to the application information, whether the unmanned aerial vehicle meets the preset condition.

The first processor is further configured to execute the following operation:

sending the flight clearance when the unmanned aerial vehicle meets the preset condition.

Optionally, the application information includes at least one of a type identification code of the unmanned aerial vehicle, a machine serial number of the unmanned aerial vehicle, a user identity corresponding to the unmanned aerial vehicle, a current position of the unmanned aerial vehicle, or a flight time of the unmanned aerial vehicle in the specific flight zone; and the information about the specific flight zone is used to indicate the specific flight zone to be entered by the unmanned aerial vehicle.

Optionally, the preset condition includes a first subcondition and a second subcondition, and the processor is further configured to execute the following operation:

obtaining accessory information of the unmanned aerial vehicle, where the accessory information of the unmanned aerial vehicle includes at least one of an examination record of the unmanned aerial vehicle, an aerial vehicle safety accident rate of the type of the unmanned aerial vehicle, a safety record of a user corresponding to the unmanned aerial vehicle, commercial credit of a user corresponding to the unmanned aerial vehicle, or an account balance corresponding to the unmanned aerial vehicle.

The determining, according to the application information, whether the unmanned aerial vehicle meets the preset condition includes:

determining, according to the application information, whether the unmanned aerial vehicle meets the first subcondition; and determining, according to the accessory information, whether the unmanned aerial vehicle meets the second subcondition.

That the unmanned aerial vehicle meets the preset condition includes:

the unmanned aerial vehicle meets both the first subcondition and the second subcondition.

Optionally, the memory stores a correspondence between a specific flight zone and a network access IP address.

The processor is further configured to execute the following operations:

obtaining a network access IP address of the unmanned aerial vehicle; determining, according to the correspondence, whether the network access IP address of the unmanned aerial vehicle is corresponding to the specific flight zone; and when the network access IP address of the unmanned aerial vehicle is corresponding to the specific flight zone, determining that the unmanned aerial vehicle meets the preset condition.

Optionally, the processor is further configured to execute the following operation:

triggering a preset safety control action when it is determined that the network access IP address of the unmanned aerial vehicle is not corresponding to the specific flight zone.

Optionally, before receiving the application information and the information about the specific flight zone, the processor is further configured to execute the following operations:

receiving a current position of the unmanned aerial vehicle;

determining a specific flight zone set according to the current position, where a distance between each specific flight zone in the specific flight zone set and the current position is less than a preset value; and sending response data, where the response data includes information about the specific flight zone set.

Optionally, the processor is further configured to execute the following operations:

when the unmanned aerial vehicle meets the preset condition, storing the application information of the unmanned aerial vehicle and the information about the specific flight zone;

receiving query information sent by a maintenance apparatus, where the query information includes information about a specific flight zone and an identifier of an unmanned aerial vehicle that appears in the specific flight zone;

obtaining a query result according to the query information, where the query result is used to indicate whether the unmanned aerial vehicle has a flight clearance for the specific flight zone; and sending the query result to the maintenance apparatus.

Referring to FIG. 13, FIG. 13 is a schematic structural diagram of an embodiment of a flight safety maintenance device according to the present invention. In this embodiment, the flight safety maintenance device includes:

a processor 1301 and a memory 1302 coupled to the processor, where the processor 1301 reads a computer program stored in the memory 1302, to execute the following operations:

performing real-time detection on at least some areas in a specific flight zone;

obtaining an identifier of an unmanned aerial vehicle when it is detected that the unmanned aerial vehicle appears in the at least some areas;

sending query information to the server, where the query information includes information about the specific flight zone and the identifier of the unmanned aerial vehicle;

receiving a query result sent by the server, where the query result is used to indicate whether the unmanned aerial vehicle has a flight clearance for the specific flight zone; and triggering a preset action when the query result indicates that the unmanned aerial vehicle does not have the flight clearance for the specific flight zone.

It may be clearly understood by persons skilled in the art that, for the purpose of convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A flight control method, comprising:
    determining, when an unmanned aerial vehicle is flying, a specific flight zone to be entered by the unmanned aerial vehicle, wherein a flight clearance is required for the unmanned aerial vehicle to enter the specific flight zone;
    sending application information and information about the specific flight zone to a server, wherein the application information is used to apply for the flight clearance to enter the specific flight zone, and wherein the information about the specific flight zone is used to indicate the specific flight zone to be entered;
    sending a flight instruction in response to receiving a flight clearance sent by the server, wherein the unmanned aerial vehicle enters the specific flight zone according to the flight instruction; and
    wherein the determining the specific flight zone to be entered by the unmanned aerial vehicle comprises:
        obtaining a current position of the unmanned aerial vehicle;
        sending the current position to the server;
        receiving response data sent by the server, wherein the response data comprises information about a specific flight zone set and a distance between each specific flight zone in the specific flight zone set, and wherein the current position is less than a preset value from each of the flight zones in the specific flight zone set; and
        determining, from the specific flight zone set, the specific flight zone that is to be entered.

2. The flight control method according to claim 1, wherein the determining a specific flight zone to be entered by the unmanned aerial vehicle comprises:
    obtaining a predetermined flight route of the unmanned aerial vehicle and a current position of the unmanned aerial vehicle; and
    determining, from the predetermined flight route according to the current position, at least one specific flight zone that is to be entered.

3. The flight control method according to claim 1, wherein the flight control method is executed by an aerial remote controller, wherein the response data specifically comprises map information of a preset area, and wherein the current position of the unmanned aerial vehicle and each specific flight zone in the specific flight zone set are located in the preset area;
    after the receiving response data sent by the server, the method further comprises:
        displaying a map of the preset area, wherein the current position of the unmanned aerial vehicle and a boundary of each specific flight zone in the specific flight zone set are highlighted in the map; and
    wherein the determining, from the specific flight zone set, the specific flight zone that is to be entered comprises:
        receiving a designation of at least one specific flight zone in the specific flight zone set; and
        determining the designated at least one specific flight zone as the specific flight zone that is to be entered.

4. The flight control method according to claim 1, wherein:
    the determining a specific flight zone to be entered by the unmanned aerial vehicle comprises:
        determining, when a boundary identifier that is of a specific flight zone and that is detected by a detector is received, a specific flight zone indicated by the boundary identifier as the specific flight zone that is to be entered, wherein the detector is located in the unmanned aerial vehicle, and is configured to detect a boundary identifier of a specific flight zone when the unmanned aerial vehicle is flying.

5. An unmanned aerial vehicle, the unmanned aerial vehicle comprising an aerial vehicle and a flight control apparatus, the flight control apparatus comprising:
    at least one processor; and a non-transitory computer-readable storage medium coupled to the at least one processor and storing programming instructions for execution by the at least one processor, the programming instructions instructing the at least one processor to:
  determine, when an unmanned aerial vehicle is flying, a specific flight zone to be entered by the unmanned aerial vehicle, wherein a flight clearance is required for the unmanned aerial vehicle to enter the specific flight zone;
  send application information and information about the specific flight zone to a server, wherein the application information is used to apply for the flight clearance to enter the specific flight zone, and the information about the specific flight zone is used to indicate the specific flight zone;
  send a flight instruction in response to receiving a flight clearance sent by the server, wherein the unmanned aerial vehicle enters the specific flight zone according to the flight instruction; and
  wherein determining the specific flight zone to be entered by the unmanned aerial vehicle comprises:
    obtaining a current position of the unmanned aerial vehicle;
    sending the current position to the server;
    receiving response data sent by the server, wherein the response data comprises information about a specific flight zone set and a distance between each specific flight zone in the specific flight zone set, and wherein the current position is less than a preset value from each of the flight zones in the specific flight zone set; and
    determining, from the specific flight zone set, the specific flight zone that is to be entered.

6. The unmanned aerial vehicle according to claim 5, wherein the programming instructions instruct the at least one processor to:
  obtain a predetermined flight route of the unmanned aerial vehicle and a current position of the unmanned aerial vehicle; and
  determine, from the predetermined flight route according to the current position, at least one specific flight zone that is to be entered.

7. The unmanned aerial vehicle according to claim 5, wherein the flight control apparatus is an aerial remote controller, the response data specifically comprises map information of a preset area, and the current position of the unmanned aerial vehicle and each specific flight zone in the specific flight zone set are located in the preset area;
  the flight control apparatus further comprises:
    a display configured to display a map of the preset area after the response data sent by the server is received, wherein the current position of the unmanned aerial vehicle and a boundary of each specific flight zone in the specific flight zone set are highlighted in the map; and
  wherein the programming instructions instruct the at least one processor to:
    receive a designation of at least one specific flight zone in the specific flight zone set, and
    determine the designated at least one specific flight zone as the specific flight zone that is to be entered.

8. The unmanned aerial vehicle according to claim 5, wherein the programming instructions instruct the at least one processor to determine, when a boundary identifier that is of a specific flight zone and that is detected by a detector is received, a specific flight zone indicated by the boundary identifier as the specific flight zone that is to be entered, wherein the detector is located in the unmanned aerial vehicle, and is configured to detect a boundary identifier of a specific flight zone when the unmanned aerial vehicle is flying.

9. A server, comprising:
  at least one processor; and
  a non-transitory computer-readable storage medium coupled to the at least one processor and storing programming instructions for execution by the at least one processor, the programming instructions instructing the at least one processor to:
    receive a current position of an unmanned aerial vehicle;
    receive application information and information about a specific flight zone, wherein the application information is used to apply for a flight clearance for the unmanned aerial vehicle to enter the specific flight zone, and wherein the server stores a preset condition corresponding to the specific flight zone;
    determine, according to the application information, whether the unmanned aerial vehicle meets the preset condition;
    send the flight clearance in response to determining that the unmanned aerial vehicle meets the preset condition;
    determine a specific flight zone set according to the current position, wherein a distance between each specific flight zone in the specific flight zone set and the current position is less than a preset value; and
    send response data, wherein the response data comprises information about the specific flight zone set.

10. The server according to claim 9, wherein the server comprises a gateway server and at least two subservers, and different subservers are configured to process application information for different types of specific flight zones, and wherein the receiving the application information and the sending the flight clearance are performed by the gateway server, and wherein the determining whether the unmanned aerial vehicle meets the preset condition is determined by at least one of the at least two subservers; and
  wherein the programming instructions instruct the at least one processor to:
    determine, by the gateway server, a type of the specific flight zone; and
    send, by the gateway server, the application information and the information about the specific flight zone to at least one of the at least two subservers corresponding to the type of the specific flight zone, wherein the at least one of the at least two subservers determines, according to the application information, whether the unmanned aerial vehicle meets the preset condition.

11. The server according to claim 9, wherein the application information comprises at least one of a type identification code of the unmanned aerial vehicle, a machine serial number of the unmanned aerial vehicle, a user identity corresponding to the unmanned aerial vehicle, a current position of the unmanned aerial vehicle, and a flight time of the unmanned aerial vehicle in the specific flight zone, and wherein the information about the specific flight zone is used to indicate the specific flight zone to be entered by the unmanned aerial vehicle.

12. The server according to claim 9, wherein the preset condition comprises a first subcondition and a second subcondition, and the programming instructions instruct the at least one processor to:

obtain accessory information of the unmanned aerial vehicle, wherein the accessory information of the unmanned aerial vehicle comprises at least one of an examination record of the unmanned aerial vehicle, an aerial vehicle safety accident rate of the type of the unmanned aerial vehicle, a safety record of a user corresponding to the unmanned aerial vehicle, commercial credit of a user corresponding to the unmanned aerial vehicle, and an account balance corresponding to the unmanned aerial vehicle;

determine, according to the application information, whether the unmanned aerial vehicle meets the first subcondition;

determine, according to the accessory information, whether the unmanned aerial vehicle meets the second subcondition; and determine that the unmanned aerial vehicle meets the preset condition in response to the unmanned aerial vehicle meeting both the first subcondition and the second subcondition.

13. The server according to claim 9, wherein the server stores a correspondence between a specific flight zone and a network access IP address; and wherein the programming instructions instruct the at least one processor to:

obtain a network access IP address of the unmanned aerial vehicle;

determine, according to the correspondence, whether the network access IP address of the unmanned aerial vehicle is corresponding to the specific flight zone; and in response to determining that the network access IP address of the unmanned aerial vehicle corresponds to the specific flight zone, determine that the unmanned aerial vehicle meets the preset condition.

14. The server according to claim 13, wherein the programming instructions instruct the at least one processor to:

trigger a preset safety control action in response to determining that the network access IP address of the unmanned aerial vehicle is not corresponding to the specific flight zone.

15. The server according to claim 9, wherein the programming instructions instruct the at least one processor to:

store the application information of the unmanned aerial vehicle and the information about the specific flight zone in response to the unmanned aerial vehicle meeting the preset condition;

receive query information sent by a maintenance apparatus, wherein the query information comprises information about a specific flight zone and an identifier of an unmanned aerial vehicle that appears in the specific flight zone;

obtain a query result according to the query information, wherein the query result is used to indicate whether the unmanned aerial vehicle has a flight clearance for the specific flight zone; and send the query result to the maintenance apparatus.

* * * * *